United States Patent
Badding et al.

(10) Patent No.: US 11,325,837 B2
(45) Date of Patent: May 10, 2022

(54) SYSTEM, PROCESS AND RELATED SINTERED ARTICLE

(71) Applicant: CORNING INCORPORATED, Corning, NY (US)

(72) Inventors: Michael Edward Badding, Campbell, NY (US); William Joseph Bouton, Big Flats, NY (US); Douglas Edward Brackley, Horseheads, NY (US); Lanrik Wayne Kester, Savona, NY (US); Thomas Dale Ketcham, Horseheads, NY (US); Eric Lee Miller, Corning, NY (US); Cameron Wayne Tanner, Horseheads, NY (US); James William Zimmermann, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/406,206

(22) Filed: Aug. 19, 2021

(65) Prior Publication Data

US 2021/0380430 A1    Dec. 9, 2021

Related U.S. Application Data

(63) Continuation of application No. 17/239,759, filed on Apr. 26, 2021, now Pat. No. 11,111,155, which is a
(Continued)

(51) Int. Cl.
*C04B 35/64* (2006.01)
*C01F 7/441* (2022.01)
(Continued)

(52) U.S. Cl.
CPC .............. *C01F 7/441* (2013.01); *C01G 25/02* (2013.01); *C03B 19/06* (2013.01); *C03B 29/12* (2013.01);
(Continued)

(58) Field of Classification Search
CPC ....... C03B 19/06; C03B 29/12; C03B 25/093; C03B 27/048; C03B 35/24; C03B 35/246;
(Continued)

(56) References Cited

U.S. PATENT DOCUMENTS 3,223,549 A      12/1965    Fredley et al.
3,704,872 A  *   12/1972    Klein ..................... B22F 3/003
                                                              432/59
(Continued)

FOREIGN PATENT DOCUMENTS

CN    103108986 A    5/2013
CN    104556666 A    4/2015
(Continued)

OTHER PUBLICATIONS

Chinese Patent Application No. 201780008498.8, Office Action dated Jan. 22, 2021, 12 pages (5 pages of English Translation and 7 pages of Original Document); Chinese Patent Office.
(Continued)

*Primary Examiner* — Erin Snelting
(74) *Attorney, Agent, or Firm* — Russell S. Magaziner

(57) ABSTRACT

A process of forming a sintered article includes heating a green portion of a tape of polycrystalline ceramic and/or minerals in organic binder at a binder removal zone to a temperature sufficient to pyrolyze the binder; horizontally conveying the portion of tape with organic binder removed from the binder removal zone to a sintering zone; and sintering polycrystalline ceramic and/or minerals of the portion of tape at the sintering zone, wherein the tape
(Continued)

simultaneously extends through the removal and sintering zones.

20 Claims, 10 Drawing Sheets

Related U.S. Application Data continuation of application No. 16/190,914, filed on Nov. 14, 2018, now Pat. No. 11,014,822, which is a continuation of application No. 15/414,109, filed on Jan. 24, 2017, now Pat. No. 10,155,667.

(60) Provisional application No. 62/287,070, filed on Jan. 26, 2016.

(51) Int. Cl.
| | |
|---|---|
| *C01G 25/02* | (2006.01) |
| *C04B 35/632* | (2006.01) |
| *C04B 35/638* | (2006.01) |
| *C03C 8/02* | (2006.01) |
| *C03B 19/06* | (2006.01) |
| *C03B 29/12* | (2006.01) |
| *C04B 35/622* | (2006.01) |
| *C03B 35/24* | (2006.01) |
| *C04B 35/111* | (2006.01) |
| *C04B 35/486* | (2006.01) |

(52) U.S. Cl.
CPC .............. *C03B 35/246* (2013.01); *C03C 8/02* (2013.01); *C04B 35/111* (2013.01); *C04B 35/486* (2013.01); *C04B 35/62218* (2013.01); *C04B 35/632* (2013.01); *C04B 35/638* (2013.01); *C04B 35/64* (2013.01); *C03C 2205/00* (2013.01); *C04B 2235/3217* (2013.01); *C04B 2235/3244* (2013.01); *C04B 2235/6025* (2013.01); *C04B 2235/656* (2013.01); *C04B 2235/6586* (2013.01); *C04B 2235/95* (2013.01); *C04B 2235/9653* (2013.01)

(58) Field of Classification Search
CPC .............. C04B 35/62218; C04B 35/64; C04B 2235/6025
See application file for complete search history.

(56) References Cited

U.S. PATENT DOCUMENTS

| | | | |
|---|---|---|---|
| 3,837,891 A * | 9/1974 | Tietz ................. | C04B 35/62236 427/224 |
| 4,726,921 A | 2/1988 | Nishigaki et al. | |
| 5,130,067 A | 7/1992 | Flaitz et al. | |
| 5,290,504 A * | 3/1994 | Milkovich ............ | F26B 13/104 264/342 RE |
| 5,432,224 A | 7/1995 | Ryuhgoh et al. | |
| 5,527,501 A | 6/1996 | Sawada et al. | |
| 5,620,637 A | 4/1997 | Kaga et al. | |
| 5,814,262 A | 9/1998 | Ketcham et al. | |
| 6,336,775 B1 | 1/2002 | Morita et al. | |
| 6,447,712 B1 | 9/2002 | Dogan et al. | |
| 6,902,790 B1 | 6/2005 | Hata et al. | |
| 8,420,981 B2 | 4/2013 | Goodman et al. | |
| 8,814,477 B2 | 8/2014 | Yorio | |
| 9,878,934 B2 | 1/2018 | Shi et al. | |
| 10,155,667 B2 | 12/2018 | Badding et al. | |
| 11,014,822 B2 | 5/2021 | Badding et al. | |
| 2009/0047562 A1 | 2/2009 | Hata et al. | |
| 2012/0247154 A1 | 10/2012 | Abramov et al. | |
| 2016/0375607 A1 | 12/2016 | Badding et al. | |

FOREIGN PATENT DOCUMENTS

| | | |
|---|---|---|
| EP | 0243858 A2 | 11/1987 |
| EP | 1063212 A1 | 12/2000 |
| EP | 1916228 A1 | 4/2008 |
| JP | 51-122162 A | 10/1976 |
| JP | 06-198629 A | 7/1994 |
| JP | 2002-173361 A | 6/2002 |
| JP | 2003-328006 A | 11/2003 |
| JP | 5124050 B1 | 1/2013 |
| WO | 2017/132216 A2 | 8/2017 |

OTHER PUBLICATIONS

CoorsTek; Ceramic Substrates for Thick-Film Electronics; http://www.coorstek.com/resource-library/library/8510-1537_thick-film_des- ign_guide.pdf; Date Accessed: Jan. 10, 2017; pp. 1-2.
International Search Report and Written Opinion of the International Searching Authority; PCT/US2017/014862; dated Aug. 2, 2017; 15 Pages; European Patent Office.
International Searching Authority Invitation to Pay Additional Fees PCT/US2017/014862 dated May 30, 2017.
Japanese Patent Application No. 2018-538652 Office Action dated Feb. 10, 2021, 6 pages (3 pages of English Translation and 3 pages of Original Document); Japanese Patent Office.
JP 2003-328006 A (Yamamasu) Nov. 19, 2003 (English language machine translation), [online] [retrieved Aug. 24, 2018], Retrieved from: Espacenet. (Year: 2003).
Minatto et al.; "Multilayered ceramic composites—a review"; Advances in Applied Ceramics (2015), vol. 114, No. 3; pp. 127-138.
Osipov et al.; "Composite Nd: YAG/Cr4+ :YAG transparent ceramics for thin disk lasers"; Ceramics International 41 (2015); pp. 13277-13280.
Suciu et al.; "Water-based tape-casting of SOFC composite 3YSZ/8YSZ electrolytes and ionic conductivity of their pellets"; Ceramics International 38 (2012); pp. 357-365.
Yoshima et al.; "Thin hybrid electrolyte based on garnet-type lithium-ion conductor Li7La3Zr2O12 for 12 V-class bipolar batteries"; Journal of Power Sources 302 (2016); pp. 283-290.

* cited by examiner

SYSTEM, PROCESS AND RELATED SINTERED ARTICLE

This Application is a continuation of U.S. application Ser. No. 17/239,759 filed Apr. 26, 2021, which is a continuation of U.S. application Ser. No. 16/190,914 filed Nov. 14, 2018, which issued as U.S. Pat. No. 11,014,822 on May 25, 2021 and which is a continuation of U.S. application Ser. No. 15/414,109 filed Jan. 24, 2017, which issued as U.S. Pat. No. 10,155,667 on Dec. 18, 2018, which claims the benefit of priority of U.S. application Ser. No. 62/287,070 filed Jan. 26, 2016, each of which is incorporated by reference herein in its entirety.

BACKGROUND

The disclosure relates generally to formation of a sintered inorganic or ceramic material, and specifically to systems and processes for sintering inorganic material in a non-contact environment as well as the sintered articles, such as ceramic sheets or tapes, made from such systems and processes.

Articles, such as thin sheets, tapes, or ribbons of ceramic have many potential uses, such as serving as waveguides, when the ceramic is transmissive to light, serving as substrates that may be coated or laminated, and integrated in batteries and other components, or other applications. Such articles are typically manufactured by forming large ingots of the sintered material, cutting wafers, slabs or plates of the material, and polishing the corresponding articles to a desired form and surface quality. Polishing helps to remove flaws or defects on the surfaces of the articles, but is time and resource intensive. Such articles may also be manufactured by tape casting, gel casting, or other processes that include sintering of green tapes, such as strips of inorganic grains bound in an organic binder. In such conventional processes, the green tapes are typically placed upon a surface, called a setter board, and placed inside a furnace that burns off the organic binder and sinters the inorganic grains. The setter board is typically formed from a refractory material that can withstand the sintering process, namely it does not react with or bond to the article that is being fired. The setter board supports the tape when the binder is removed, and at least one surface of the remaining inorganic material is in contact with the setter board during sintering.

SUMMARY

One embodiment of the disclosure relates to a process of forming a sintered article. The process includes supporting a piece of inorganic material with a pressurized gas. The process includes sintering the piece of inorganic material while supported by the pressurized gas by heating the piece of inorganic material to a temperature at or above a sintering temperature of the inorganic material such that the inorganic material is at least partially sintered forming the sintered article, and at least a portion of the inorganic material being sintered is not in contact with a solid support during sintering.

One embodiment of the disclosure relates to a sintered article. The sintered article includes a first major surface, a second major surface opposite the first major surface, an at least partially sintered inorganic material defining the first major surface, the second major surface and a body extending between the first and second major surfaces. The sintered article includes an average thickness between the first and second major surfaces that is no more than 1 mm. The sintered article includes a width defined as a first dimension of one of the first or second major surfaces orthogonal to the thickness. The sintered article includes a length of the sintered article defined as a second dimension of one of the first or second major surfaces orthogonal to both the thickness and the width of the sintered article. The sintered article is thin such that at least one of the widths and the lengths is greater than five times the average thickness. The first major surface is defined by a first surface quality metric and the second major surface is defined by a second surface quality metric. The first surface quality metric is substantially the same as the second surface quality metric. The inorganic material is selected from the group consisting of polycrystalline ceramic and synthetic mineral.

An additional embodiment of the disclosure relates to a system for forming a sintered article. The system includes a tape supply of a tape material comprising grains of an inorganic material bound by an organic binder. The system includes a binder removal station following the tape supply. The system includes a sintering station following the binder removal station. The system includes a heating system heating the binder removal station and the sintering station. The heating system heats the binder removal station to a temperature between 100 and 400 degrees Celsius such that the organic binder is pyrolyzed as the tape material traverses the binder removal station. The heating system heats the sintering station to a temperature greater than 800 degrees Celsius such that the inorganic material at least partially sinters as the tape material traverses the sintering station. The system includes a gas bearing supporting the tape material within the binder removal station and the sintering station.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Figure 1:
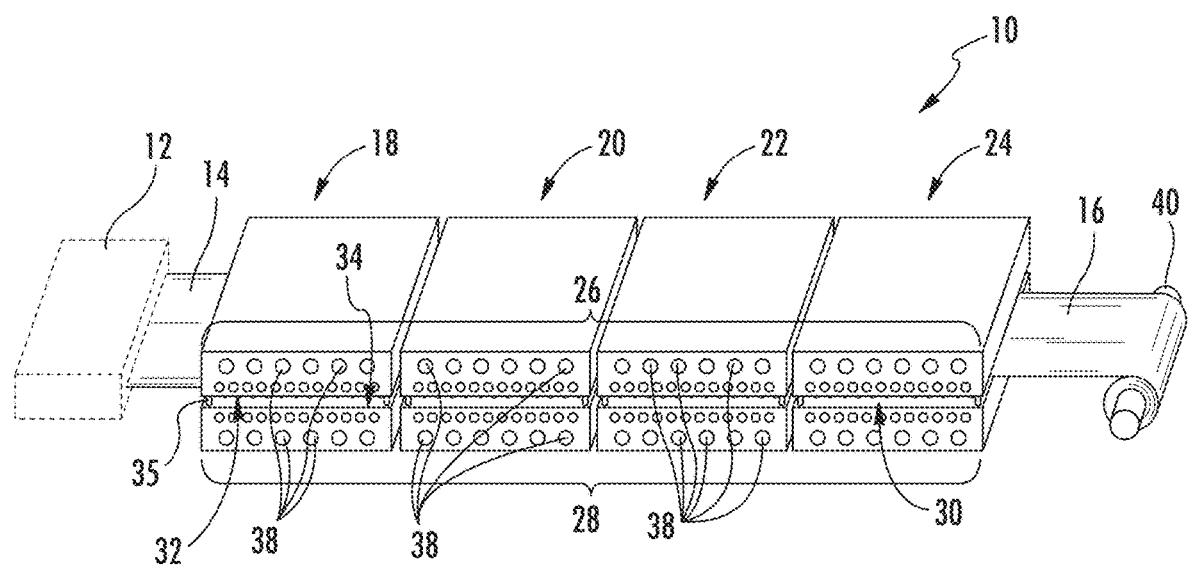
FIG. 1 is a sintering system according to an exemplary embodiment.

Referring generally to the figures, various embodiments of a sintered article (such as a ceramic article, tape or sheet) and a system and method for forming a sintered article are shown. In various embodiments discussed herein, the sintered article is formed, at least in part, in a non-contact sintering process. In various embodiments, this non-contact sintering is provided by a system that supports a piece, strip or tape of inorganic material with a gas bearing while heat is being delivered to the inorganic material to cause sintering. In this arrangement, neither of the major surfaces of the piece of inorganic material are supported by or in contact with a solid support (such as a setter board) during sintering.

Applicant believes that this non-contact sintering process enables formation of higher quality sintered articles, such as ceramic articles, than contact-based processes. Because both major surface of the inorganic material experience essentially the same conditions due to the gas bearing support, sintered articles as discussed herein may be formed having very high surface qualities and highly consistent surfaces qualities between the first and second major surfaces. For example, because both surfaces are only contacted by the gas (e.g., air) from the gas bearing neither of the major surfaces are altered by chemical or particulate contaminants as is typically the case with the surface of a ceramic article sintered on a setter board. As another example, because the inorganic material shrinks or contracts during sintering, the non-contact sintering process discussed herein allows for frictionless, unconstrained shrinkage or growth during all stages of the sintering process thereby preventing development of stresses and eliminating formation of scratches or abrasions present in articles sintered on a setter-board. This lack of solid contact during sintering provides a sintered article with high levels of surface flatness, low surface defect levels, and low surface roughness levels in the as-formed article, without the need to polish the major surfaces of the article.

Further, Applicant believes that due to the reduction or elimination of the stress, friction and abrasion common in setter board based sintering systems, the non-contact sintering system discussed herein enables the formation of large area sintered articles, not believed obtainable with the prior sintering techniques. In particular, the systems discussed herein enable the formation of large area sintered articles having the high quality surfaces discussed above without the need for polishing. In addition, Applicant believes that the systems discussed herein enable the formation of sintered articles that are very thin and with major surfaces that are large in surface area.

Further, in specific embodiments discussed herein, the inorganic material is sintered while supported on both major surfaces by gas bearings. Applicant believes that by applying non-solid contact pressure to both major surfaces of the piece of inorganic material via the gas bearing during sintering, even higher quality and/or larger sintered articles can be produced. For example, by pressing on both major surfaces with the gas bearing during sintering, Applicant believes that problems such as cracking, curling and warping common during sintering can be reduced or eliminated even in large area sintered articles without introducing the problems (e.g., surface defects, contaminants, etc.) presented by solid surface support as discussed above. Further, the pressure provided on both major surfaces by the gas bearing may also function to support, compact or generally hold together the inorganic material following pyrolysis of a binder material while the inorganic material is being moved into a sintering station and during sintering.

Referring to FIG. 1, a system 10 and related method for sintering a piece of inorganic material is shown. In general, system 10 includes a supply 12 of inorganic material, shown as tape 14. In general, tape 14 is an elongate piece of material including one or more inorganic material bound together with an organic binder material, and in general, as tape 14 traverses the various sections of system 10, most or all of the binder material of tape 14 is removed (e.g., via burning and/or charring) and the inorganic material is at least partially sintered forming a sintered article or material, shown as sintered material 16, at the output of system 10. In various embodiments supply 12 is any source of tape 14. In various embodiments, supply 12 may be a reel or spool of elongate tape 14 that is unwound as tape 14 is moved through system 10. In other embodiments, supply 12 may be a system that forms tape 14 within system 10 (e.g., inline with the downstream components discussed below). In various embodiments, tape 14 includes particles of a wide variety of materials, including ceramics, glass and/or metals, held together by an organic binder, and in specific embodiments, tape 14 is made processes such as tape casting, calendaring, extrusion, and combinations thereof.

In general, system 10 includes a binder removal station or zone 18, a heating station or zone 20, a sintering station or zone 22 and a cooling station or zone 24. System 10 includes a gas bearing system that includes upper and lower gas bearings, shown as gas bearings 26 and 28, and a channel 30 defined by opposing bearing surfaces 32 and 34. Gas bearings 26 and/or 28 include posts or stand-offs 35 that supports and spaces gas bearings 26 and 28 from each other. In general, upper and lower gas bearings 26 and 28 include a plurality of pores or nozzles 36 (shown in FIGS. 4 and 5) that deliver gas into a channel 30 defined between opposing bearing surfaces 32 and 34. Gas supplied to channel 30 via gas bearings 26 and 28 is supplied at a large enough rate or pressure such that a inorganic tape 14 and sintered material 16 is supported within bearing channel 30 such that they do not come into contact with bearing surfaces 32 and 34 while being processed in system 10. In this arrangement, gas bearings 26 and 28 extend between binder removal station 18, through heating station 20, sintering station 22 and cooling station 24 such that neither of the major surfaces of the tapes are contacted during traversal of these stations.

In at least some embodiments, system 10 may include insulating separators located between zones 18, 20, 22 and 24 to isolate the zones from each other and limit heat transfer between zones. In various embodiments, system 10 may include unheated or room-temperature separators zones located between zones 18, 20, 22 and 24, and specifically located between the gas bearings 26 and 28 of each zones. In some such embodiments, the separator zones may include a tensioning device applying tension to tape 14 or ceramic sheet 16 such that tape 14 or ceramic sheet 16 is supported and guided across the separator zone, and in some such embodiments, the separator zones are non-gas bearing support sections. However, in other embodiments, the room temperature separator zones include gas bearings that support tape 14 or ceramic sheet 16 as it traverses the separated section.

As shown in FIG. 1, system 10 includes a plurality of different gas bearing sections that are aligned to form a straight channel 30 extending through system 10. In particular embodiments, alignment of the gas bearing elements is important to ensure that channel 30 is straight such that the forces provided by gas bearings 26 and 28 are consistent along the length of system 10 to eliminate unwanted shifting (e.g., lateral shifting) that may otherwise occur at the transitions between the various zones of system 10. In one embodiment, system 10 includes a supporting system that monitors positions of the gas bearing sections vertically and horizontally relative to each other and that allows for alignment of the gas bearing sections either manually or automatically to provide kinematic control and stability.

In yet other embodiments, system 10 may include additional zones or stations. In one such embodiment, system 10 includes a zone for a post-sintering heat treatment such as annealing.

Gas bearings 26 and 28 may be any suitable gas or air support system. In various embodiments, the gas bearing bodies may be solid or porous in configuration. Suitable materials for the gas bearing bodies include, but are not limited to, aluminum, bronze, carbon or graphite, stainless steel, high temperature alloys like UNS N06333 and UNS N06025, platinum and its alloys, ceramics like silicon carbide, etc. The gas bearing body dimensions may be designed based on the shape or size of tape 14 and sintered material 16 and to efficiently and effectively support tape 14 and sintered material 16 within bearing channel 30. In the case where the bearing bodies are porous, they may still include additional apertures or holes for flowing gas and/or may use the porous structure to provide flow.

In various embodiments, gas flow rates, gas compositions and/or temperatures can be independently controlled for zones 18, 20, 22, and 24. In some embodiments, gas bearings 26 and 28 are configured to deliver an oxidative gas (e.g., atmospheric air or oxygen) to both sides of tape 14 and sintered material 16. However, gas bearings 26 and 28 may be configured to deliver any gas desired for different applications. In some embodiments, nitrogen, helium, neon and/or argon may be delivered via gas bearings 26 and 28. In some embodiments, a reactive gas or a gas carrying an additive, dopant, reactant, etc., may be delivered via gas bearings 26 and 28 to add a material or to react with the material of tape 14 during processing, such as during sintering. In some embodiments, gas bearings 26 and 28 are configured to deliver a reducing gas, an inert gas or a forming gas to channel 30. In various embodiments the gas supplied by gas bearings 26 and 28 has been filtered, humidified or dried. In some embodiments, a first gas may be delivered via gas bearing 26 and a second, different gas may be delivered via gas bearing 28, which in such embodiments, may allow for the formation of sintered material 16 having different properties on the opposing first and second major surfaces.

System 10 includes a heating system, which in the embodiment shown, includes a plurality of heating elements 38 located within gas bearings 26 and 28. Heating elements 38 deliver heat to each of the stations of system 10 to process tape 14 into sintered material 16 as discussed in more detail below. Heating elements 38 are in communication with the solid portions of the bearing bodies of bearings 26 and 28 within zones 18, 20 and 22 and/or with the air delivered to the heated portion of bearing channel 30. In specific embodiments, heating elements 38 may be resistive heating elements located within or embedded in the heated portions of bearings 26 and 28 such that the gas being delivered to bearing channel 30 within stations or zones 18, 20 and 22 is heated to the desired temperatures. Heating elements 38 may be part of any type of suitable heating system to control the temperatures as discussed herein. In various embodiments, heating elements 38 may be part of an oven or furnace delivering heat, such as hot air, to gas bearings 26 and 28. In some embodiments, where very high sintering temperatures (e.g., 1800 degrees Celsius or greater) are needed, heating elements 38, at least within sintering zone 22, may be one or more plasma torch. Heat may be supplied by other methods such as by induction or with use of a combustible gas mixture. The rate of flow of the pressurized gas may also be adjusted for controlled cooling.

In one exemplary embodiment, heating elements 38 may be resistive heating wires formed from a platinum-rhodium material, and in a specific embodiment, heating elements 38 are 80% platinum, 20% rhodium wires. In some such embodiments, the heating elements 38 reside within alumina tubing located within air bearings 26 and 28. In a specific embodiment, the platinum-rhodium heating elements have a diameter of 0.040 inches. Applicant has built and tested an air bearing utilizing such heat elements to heat with 2.5 kW to over 1000 degrees C. In specific embodiments, heating elements 38 are powered with a power source of 100 Amps at 100 VDC.

Figure 2:
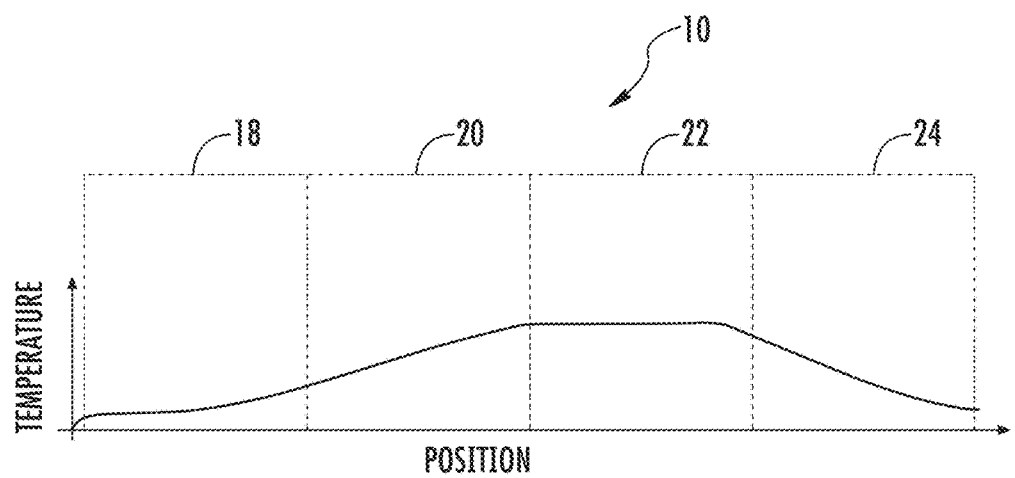
FIG. 2 is a plot of temperature vs. position within the sintering system of FIG. 1 according an exemplary embodiment.

Referring to FIG. 1 and FIG. 2, processing of tape 14 into sintered material 16 is shown. Tape 14 is fed from tape supply 12 into binder removal station 18, and the heating elements 38 of binder removal station 18 heat tape 14 to a sufficient temperature such that most or all of the organic binder of tape 14 is removed via a process, such as pyrolysis, as tape 14 traverses binder removal station 18 leaving a self-supporting tape or sheet of the inorganic material of tape 14. In various embodiments, heating elements 38 heat binder removal station 18 to a temperature between 100 and 400 degrees Celsius sufficient to pyrolyze the organic binder material. In various embodiments, a large percentage, e.g., more than 50%, more than 70%, more than 90%, more than 99%, of the organic binder of tape 14 is removed as tape traverses binder removal station 18.

In various embodiments, tape 14 entering binder removal station 18 is a green tape material including inorganic material bound together with an organic binder. According to exemplary embodiments, tape 14 includes inorganic material, such as polycrystalline ceramic and/or minerals (e.g., alumina, zirconia, lithium garnet, spinel), bound by an organic binder (e.g., polyvinyl butyral, dibutyl phthalate, polyalkyl carbonate, acrylic polymers, polyesters, silicones, etc.). In contemplated embodiments, tape 14 includes inorganic material, such as metal particles, bound in an organic binder. In other contemplated embodiments, tape 14 includes inorganic material, such as glass grains (e.g., high purity silica grains, borosilicate, aluminosilicate, soda lime) or other inorganic grains bound by an organic binder. In contemplated embodiments, tape 14 includes inorganic material, such as glass-ceramic particles (e.g. cordierite, LAS lithium aluminosilicates, Nasicon structure lithium metal phosphates, celsian), bound in an organic binder. According to an exemplary embodiment, tape 14 has a porosity of from about 0.01 to about 25 vol % and/or the inorganic particles have a median particle size diameter of from 50 to 1,000 nanometers and a Brunauer, Emmett and Teller (BET) surface area of from 2 to 30 $m^2/g$. In other contemplated embodiments, the above materials may be bound by inorganic binders or other binders and/or the above materials may be otherwise sized or have other porosity.

Following binder removal, tape 14 moves into heating station 20. Heating elements 38 within heating station 20 generates heat such that the temperature within heating zone 20 gradually rises along the length of heating station 20. In this manner, heating station 20 acts as a preliminary heating zone which gradually raises the temperature of tape 14 to a temperature close to the temperature needed for sintering, and in some embodiments, begins the sintering process. In some embodiments, the gradual temperature increases across heating station 20 limits the formation of defects, cracks, etc. that may otherwise be formed by moving tape 14 directly into the high temperature sintering station. In various embodiments, heating zone 20 raises the temperature of tape 14 to a temperature of at least 70%, specifically at least 90%, and more specifically at least 95%, of the temperature within sintering zone 22. In addition, heat provided by heating zone 20 removes some or all residual binder material remaining in tape 14 entering zone 20.

As will be understood, following binder removal station 18, the inorganic material of tape 14 is no longer bound by the organic binder material, but is substantially unsintered prior to processing through sintering station 22. Because tape 14 following binder removal no longer includes significant levels of binder material, one of ordinary skill in the art may expect tape 14 following binder removal to simply collapse or fall apart under its own weight. However, Applicant has discovered that the tape 14 following binder removal remains intact, despite the binder being burned off and/or charred, if the tape 14 is properly handled. In some embodiments, Applicant believes that pressure applied by gas bearings 26 and 28 to both sides of tape 14 facilitate handling and processing through system 10 following binder removal by holding together the inorganic material of tape 14 after removal of the binder material. In a specific embodiment, gas pressure provided by gas bearings 26 and 28 is applied in either uniaxial or isostatic manner to aid in consolidation and pore removal and speed sintering. In various embodiments, gas bearings 26 and 28 are configured to provide gas at pressures between 0.5 and 200 psig.

Following heating zone 20, tape 14 moves into sintering zone 22. In general, within sintering zone 22, heating elements 38 generate heat such that tape 14 is heated to a temperature sufficient to sinter the inorganic material of tape 14 to form a sintered article, such as sintered material 16. As will be understood, heating of the inorganic material of tape 14 densifies or reduces the porosity of the inorganic material. The degree or amount of sintering achieved in sintered material 16 is a function of the temperature and time that tape 14 spends within sintering zone 22. Further, the sintering temperature provided by sintering zone 22 also depends on the inorganic material being sintered, and in general, heating elements 38 raise sintering zone 22 to a temperature greater than 800 degrees Celsius and maintains this temperature substantially constant over the length of sintering zone 22. In particular embodiments, the temperature of sintering zone 22 varies less than 30%, specifically less than 10% and more specifically less than 5% over the length of sintering zone 22.

In specific embodiments, sintering zone 22 is configured to at least partially sinter the inorganic material of tape 14, such as the polycrystalline ceramic or other inorganic material of tape 14. For example, in specific embodiments, polycrystalline ceramic grains may be sintered with in sintering zone 22 such that the grains bond or fuse to one another forming a sintered material 16 that includes a large amount of porosity (e.g., at least 10% by volume, at least 30% by volume), where the "porosity" refers to the portions of the volume of the tape unoccupied by the inorganic material, such as the polycrystalline ceramic.

Following sintering within zone 22, sintered material 16 enters cooling zone 24 which cools sintered material 16 to a temperature low enough that sintered material 16 can be moved, contacted, stored, etc. without damaging the material. In one embodiment, cooling zone 24 cools tape to a temperature below 150 degrees Celsius. In the particular embodiment shown, sintered material 16 exits cooling station 24 and is stored in a storage location, such as uptake reel 40. Thus, in such embodiments, by utilizing the non-contact gas bearings, system 10 enables the formation of long pieces of high quality sintered material 16 in a substantially continuous fashion. As will be noted from FIG. 1, system 10 enables the formation of sintered material 16 having a length longer than any one of the sections of system 10 and longer than stations 18, 20, 22 and 24 of system 10. This is contrast to conventional, batch process ceramic sintered on a solid support, such as a setter board, which is size limited by both the setter board and the heating furnace typical in such processes.

FIG. 1 shows system 10 arranged as a generally horizontal, linear processing system. In other embodiments, system 10 is vertically arranged or arranged at a sloped angle relative to the horizontal plane.

Figure 3:
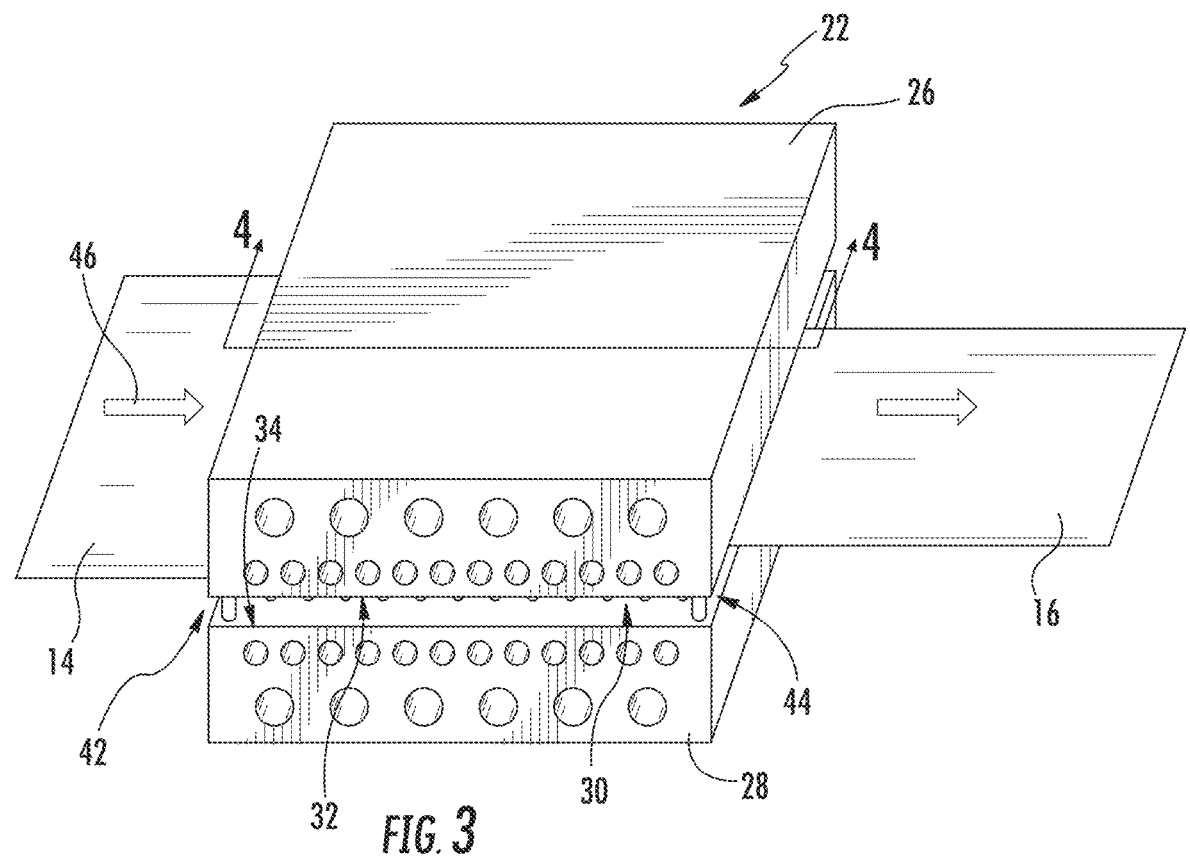
FIG. 3 is a sintering station according to an exemplary embodiment.
Figure 4:
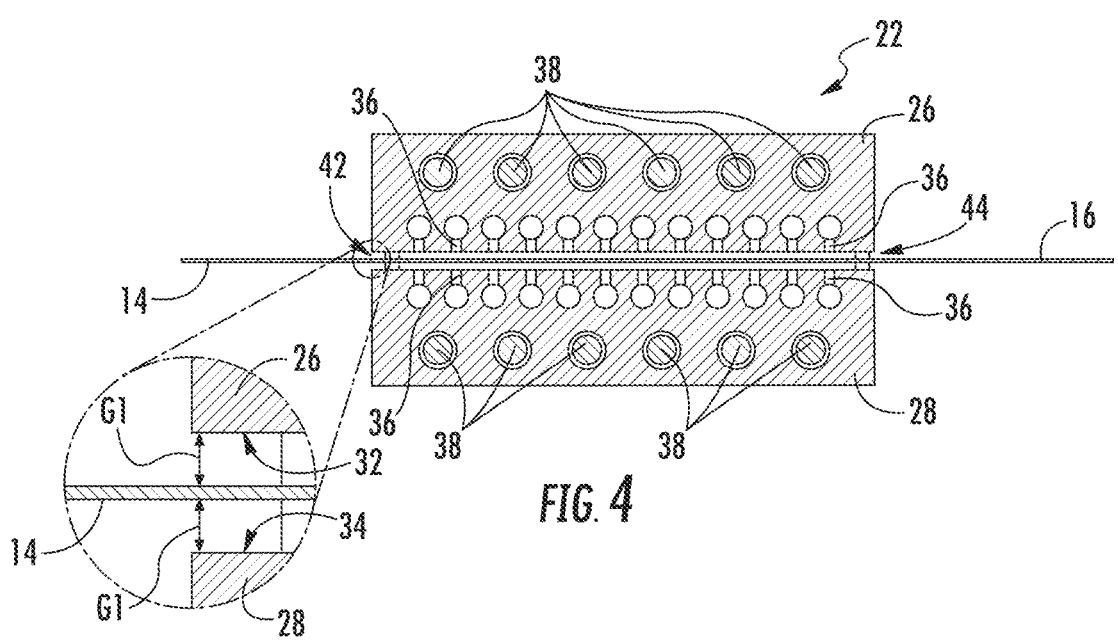
FIG. 4 is a cross-sectional view of the sintering station of FIG. 3 according to an exemplary embodiment.
Figure 5:
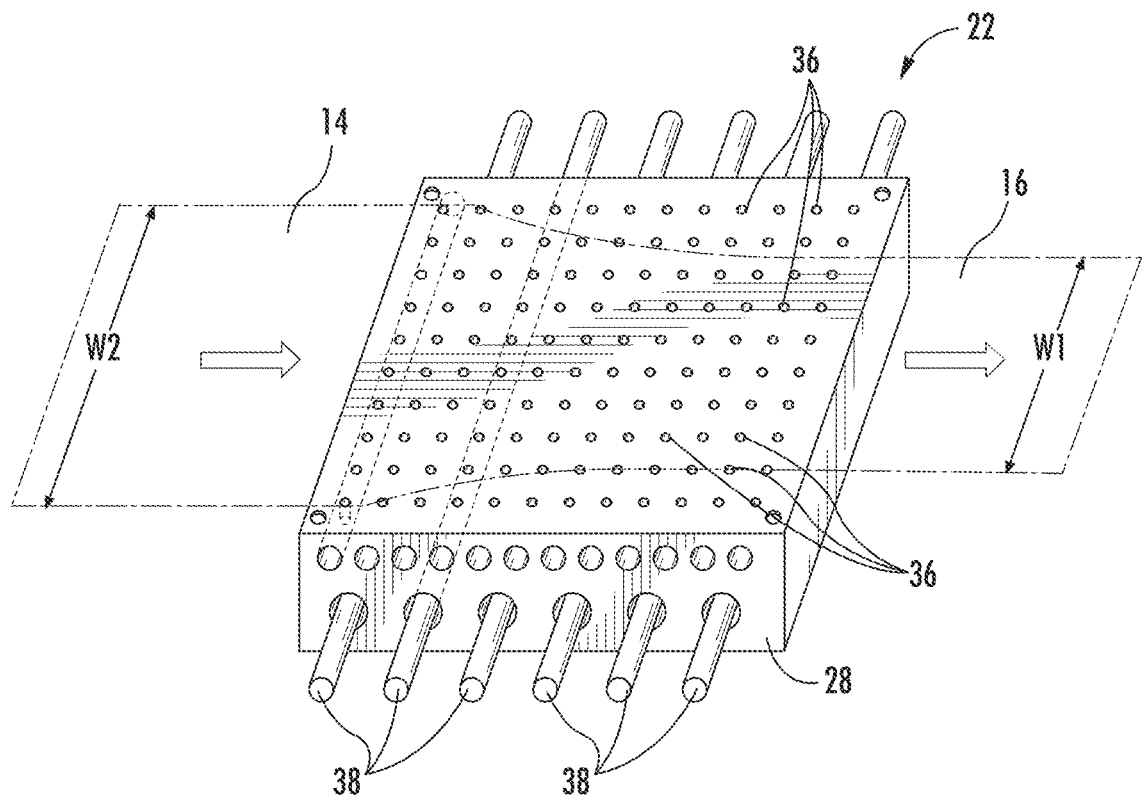
FIG. 5 is the sintering station of FIG. 3 with the gas upper bearing structure removed according to an exemplary embodiment.

Referring to FIGS. 3-5, sintering zone 22 and sintering of tape 14 is shown and described in more detail. As tape 14 traverses sintering zone 22, the inorganic material of tape 14 is sintered such that sintered material 16 exits the output side of sintering zone 22. Within sintering zone 22, tape 14 enters a first or input end 42 of channel 30, and the heat within sintering zone 22 causes the inorganic material of tape 14 to sinter (e.g., densify, decrease porosity, etc.) as the tape 14 moves toward output end 44 of channel 30. In this arrangement, the density of the inorganic material present in sintered material 16 exiting output end of channel 30 is greater than the density of the inorganic material of tape 14 entering input end 42 at the start of sintering zone 22. Further, as shown in FIG. 3, the continuous nature of system 10 and the related process allows for the sintering of material that has a relatively long length, such that the length of both tape 14 and sintered material 16 in the processing direction, shown as arrow 46, is greater than the length of sintering zone 22 in the processing direction between input end 42 and output end 44 of channel 30.

As shown best in FIG. 5, sintering within sintering zone 22 also causes contraction or shrinkage of tape 14, such that a width, W1, of sintered material 16 exiting sintering station 22 is less than a width, W2, of tape 14 entering sintering station 22. In various embodiments, the shrinkage during sintering is substantial, such that W1 is less than 90% of W2, specifically less than 80% of W2, and more specifically less than 75% of W2. As will be understood contraction during sintering also occurs in the thickness direction and in the length direction, and in various embodiments, the length contraction is accounted for by a slower linear rate of output of the tape than the rate at which it is fed into the system. Because this contraction occurs while tape 14 is supported by gas bearings 26 and 28, the major surfaces of sintered material 16 are high quality surfaces with low levels of defects. In contrast to typical setter board based sintering processes which introduce different defects such as abrasions, drag marks, pits, tears, etc. caused as the contracting inorganic material is pulled across the solid setter board surface during sintering, sintered material 16 includes very few or no defects resulting from the contraction during sintering.

Referring to FIG. 4, the arrangement of gas bearings 26 and 28 within sintering zone 22 are shown in more detail. In particular, gas bearings 26 and 28 are spaced from each other such that the gap size between opposing bearing surfaces 32 and 34 is sufficient to support tape 14 during sintering. In this arrangement, gas bearings 26 and 28 provide gas to channel 30 on both sides of tape 14. In this arrangement, not only do gas bearings 26 and 28 support tape 14 in a noncontact environment during sintering, but gas bearings 26 and 28 also apply gas pressure to both of the major surfaces of tape 14 (e.g., upper and lower surfaces in the orientation of FIG. 4) such that deformation (e.g., curling, cracking, etc.) of tape 14 is limited or eliminated during binder removal and/or during sintering.

Further, gas bearings 26 and 28 may also be configured to apply pressure to both of the major surfaces of tape 14 to shape, compact or flatten tape 14 during sintering. In some embodiments, bearing surfaces 32 and 34 may be shaped, curved, corrugated, etc. imparting the corresponding shape to sintered material 16. In addition, curved bearing surfaces 32 and 34 may be utilized to limit or prevent warping or bow in sintered material 16 in the direction across sintered material 16, perpendicular to the direction of movement through system 10. Sintered material 16 with arced, corrugated, or other one-dimensionally shaped profiles can be made by the continuous process starting with a flat tape or sheet as the input using a high temperature gas bearing with a shaped profile. For a corrugated profile across the width of the sheet, the high temperature gas bearing corrugation wavelength could decrease in unison with the sintering shrinkage. In various embodiments, instead of, or in addition to, shaping during sintering, shaping or forming stations may be located between sintering zone 22 and cooling zone 24.

In some embodiments, the gap size between bearing surfaces 32 and 34 and the major surfaces of tape 14 may also be sized to facilitate effective heat transfer (e.g., via high levels of conductive heat transfer) from bearings 26 and 28 into tape 14. In such embodiments, because of the high levels of heat transfer provided by bearings 26 and 28, system 10 allows for heating and sintering using relatively low amounts of energy as compared to furnace or kiln based sintering systems.

In various embodiments, the height of channel 30 (e.g., the distance between opposing bearing surfaces 32 and 34) is selected to support tape 14 and/or provide the various support functions discussed herein. In various embodiments, the height of channel 30 is selected such that the gap size, G1, between bearing surface 32 or 34 and the opposing major surface of tape 14 allows for the desired bearing functionality and is based on the thickness of tape 14. Accordingly, as shown in FIG. 4, the height of channel 30 is equal to G1 times 2 plus the thickness of tape 14. In various embodiments, G1 is between 0.1 μm and 10 mm.

Figure 13:
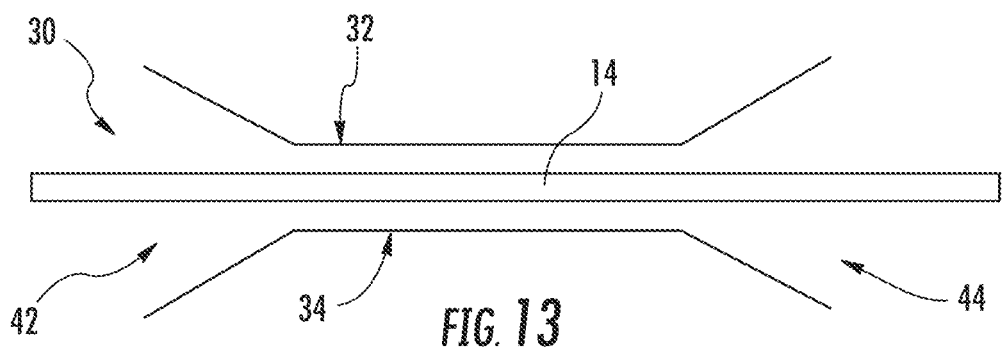
FIG. 13 shows a gas bearing arrangement according to another exemplary embodiment.

In one embodiment, the height of channel 30 and consequently G1 decreases along the length of gas bearings 26 and 28 in the processing direction. Applicant believes that by providing a wider gap size at input end 42 of channel 30, insertion of tape 14 into the sintering zone gas bearing may be easier and the decreasing size of the gap along the length of the gas bearing increases pressure compressing and flattening the tape during sintering. In some embodiments, referring to FIG. 13, bearing surfaces 32 and 34 are shaped such that input end 42 is expanded (e.g., having a greater channel height) and output end 44 is expanded (e.g., having a greater channel height) relative to a central portion of channel 30. In various embodiments, this shape increases the stability of tape 14 and/or sintered material 16 entering or exiting the gas bearing and/or helps isolate the air bearing channel from adjacent processing zones.

Figure 6:
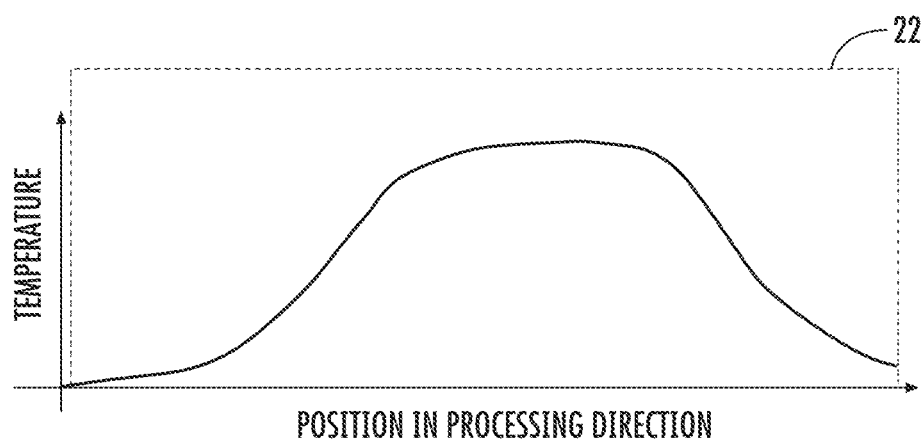
FIG. 6 is a plot of temperature vs. position within the sintering station of FIG. 3 according to an exemplary embodiment.

Referring to FIG. 6, the temperature profile across sintering station 22 is shown according to an exemplary embodiment. As shown in FIG. 6, temperature within sintering station 22 generally increases and reaches a maximum toward the center of sintering station 22. As will be understood from a comparison of FIG. 6 and FIG. 2, the scale of FIG. 6 is substantially less than that of FIG. 2 to highlight the temperature distribution across sintering station 22, even though the temperature variation across sintering station 22 is relatively small compared to the temperature various across system 10 as shown in FIG. 2.

Figure 7:
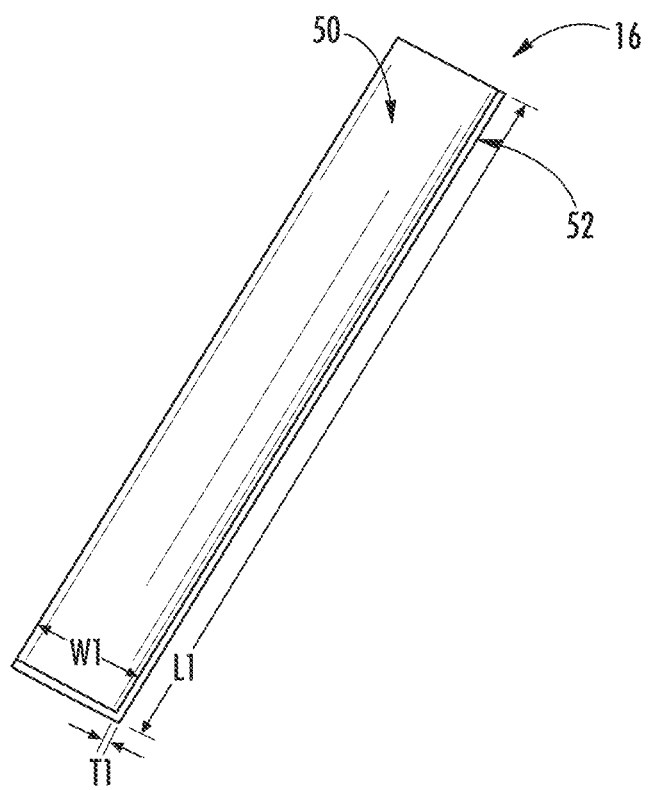
FIG. 7 is a sintered article according to an exemplary embodiment.
Figure 8:
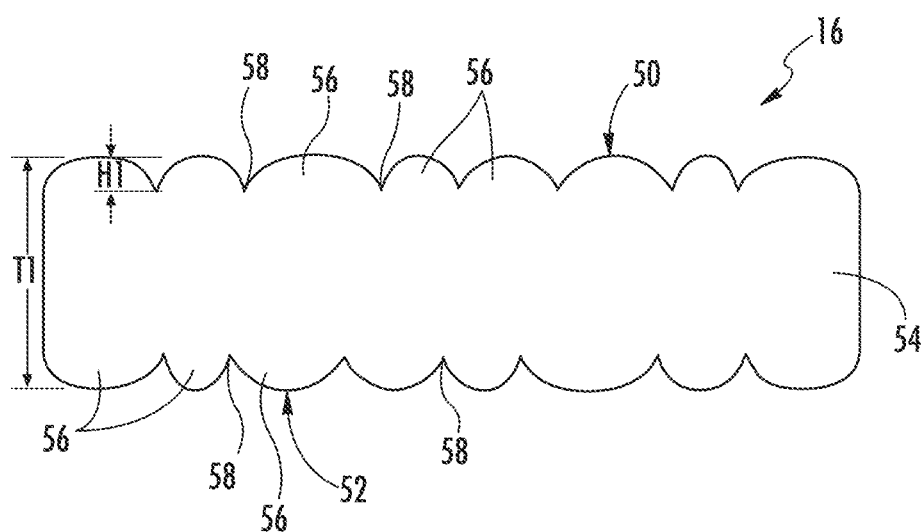
FIG. 8 is a cross-sectional view of the sintered article of FIG. 7 according to an exemplary embodiment.

Referring to FIG. 7 and FIG. 8, sintered material 16 formed via the process and system described above regarding FIGS. 1-6 are shown and described. In general, sintered material 16 is a relatively thin sheet of sintered ceramic material. As noted above, because of the advantages of the non-contact, gas bearing support sintering process described above, sintered material 16 formed by the system and process discussed herein, has high quality opposing major surfaces, in the as-formed state (e.g., without polishing). Further, because of the nature of the support provided by the system and process discussed herein, sintered materials with one or more of these high surface qualities can be produced at large sizes previously believed unobtainable using the conventional setter board based sintering processes. As will be explained in more detail below, sintered material 16 formed by the system and process of the present disclosure have first and second major surfaces, and each major surface includes at least one surface quality metric that is substantially the same as the surface quality metric of the other major surface, and in specific embodiments, each major surface includes multiple surface quality metrics that are substantially the same as the surface quality metrics of the other major surface Applicant believes that this high level of surface quality consistency is enabled by the non-contact system discussed herein, at least in part, because system 10 allows for both of the opposing surfaces of tape 14 to experience essentially the same non-contact conditions (e.g., gas content, pressure, temperature, etc.) during sintering. It should be noted that at least some surface quality features between the opposing major surfaces of sintered material 16 may be different from each other resulting from the process forming tape 14.

Referring to FIG. 7 and FIG. 8, a sheet of sintered material 16 (e.g., sheet, foil, tape, etc.) includes a first major surface, shown as upper surface 50, and a second major surface, shown as lower surface 52, which is opposite of upper surface 50. The sintered article further includes a body 54 of material extending between the first surface 50 and second surface 52.

Sheet of sintered material 16 includes a thickness T1 which is defined as a distance between first surface 50 and second surface 52. Sheet of sintered material 16 includes a width, W1, and a length, L1. Width W1, may be defined as a first dimension of one of first surface 50 and/or second surface 52 that is orthogonal to the thickness T1. Length L1, may be defined as a second dimension of one of first surface 50 and/or second surface 52 that is orthogonal to both thickness T1 and width W1. According to an exemplary embodiment, a sheet of sintered material 16 is an elongate thin tape of sintered material. Due at least in part to geometry, some such embodiments are flexible, allowing sheet of sintered material 16 to bend around a mandrel or spool, such as uptake reel 40, having a diameter of 1 meter or less, 0.7 meters or less, etc., which may be beneficial for manufacturing, storage, etc. In other embodiments, sheet of sintered material 16 may be otherwise shaped, such as round, annular, sleeve- or tube-shaped, not have a constant thickness, etc.

According to an exemplary embodiment, length L1 is greater than twice width W1, such as at least 5 times, at least 10 times, at least 100 times greater. In some embodiments, width W1 is greater than twice the thickness T1, such as at least 5 times, at least 10 times, at least 100 times greater. In some embodiments, width W1 is at least 5 millimeters, such as at least 10 mm, such as at least 50 mm. In some embodiments, thickness T1 is no more than 1 cm, such as no more than 2 centimeters, such as no more than 5 millimeters, such as no more than 2 millimeters, such as no more than 1 millimeter, such as no more than 500 micrometers, such as no more than 200 micrometers. In particular embodiments, T1 is as low as 2 micrometers and W1 is greater than 30 mm. According to an exemplary embodiment, as tape 14 is passed through system 10 and allowed to sinter, the sintering occurs nearly uniformly; and length, width and thickness of the sheet may diminish up to approximately 30%. As such, dimensions of tape 14 disclosed herein may be up to 30% greater than those described for sintered material 16 discussed herein. Thin tapes may allow the manufacturing line to operate rapidly because heat from the various stages of system 10 can quickly penetrate and sinter such tapes. Further, thin tapes may be flexible, facilitating bends and changes in direction along system 10.

According to other exemplary embodiments, thickness T1 is no more than 500 micrometers, such as no more than 250 micrometers, such as no more than 100 micrometers, and/or at least 20 nanometers. According to an exemplary embodiment, sheet of sintered material 16 is a large area sheet such that first major surface 50 and/or second major surface 52 have surface areas of at least 10 square centimeters, such as at least 30 square centimeters, such as at least 100 square centimeters, and even exceeding 1000, 5000, or even 10,000 square centimeters in some embodiments. In some embodiments, width W1 that is less than ¼, ⅕, ⅙, ⅐, ⅛, ⅑, ⅒ and/or 1/20 length L1. Such geometries may be particularly useful for certain applications, such as for use of sheet of sintered material 16 as a substrate of a rectilinear battery and/or for use of sheet of sintered material 16 as a surface for growing carbon nanotubes in an oven, where sheet of sintered material 16 fills surfaces of the oven, yet does not fill substantial volume of the oven.

In various embodiments, sheet of sintered material 16 is thinner than 1 mm, wider than 20 cm and longer than 70 cm. In various embodiments, sheet of sintered material 16 is thinner than 1 mm, wider than 30 cm and longer than 70 cm. In various embodiments, sheet of sintered material 16 is a 1 mm thick article wider than 50 cm and longer than 70 cm.

In various embodiments, sheet of sintered material 16 has a width W1 greater than 20 cm and a length L1 greater than 70 cm having thicknesses of 750 microns or less and more specifically of 500 microns or less. In various embodiments, sheet of sintered material 16 is thinner than 250 microns, wider than 20 cm and longer than 70 cm. In various embodiments, sheet of sintered material 16 is thinner than 250 microns, wider than 30 cm and longer than 70 cm. In various embodiments, sheet of sintered material 16 is thinner than 250 microns wider than 50 cm and longer than 70 cm.

In various embodiments, sheet of sintered material 16 is thinner than 100 microns, wider than 20 cm and longer than 70 cm. In various embodiments, sheet of sintered material 16 is thinner than 100 microns, wider than 30 cm and longer than 70 cm. In various embodiments, sheet of sintered material 16 is thinner than 100 microns wider than 50 cm and longer than 70 cm are achievable.

According to an exemplary embodiment, sheet of sintered material 16 is substantially unpolished such that first surface 50 and/or second surface 52 have a granular profile as shown conceptually in FIG. 8. The granular profile includes grains 56 protruding generally outward from the body 54 with a height H1 (e.g., average height) relative to recessed portions of the surface at boundaries 58 between grains 56. In specific embodiments, height H1 is at least 25 nanometers and/or no more than 150 micrometers, specifically is at least 50 nanometers and/or no more than 80 micrometers.

The granular profile is an indicator of the process of manufacturing sheet of sintered material 16 in that the sintered material 16 was sintered as a thin tape in a non-contact environment, as opposed to being cut from a boule, and that surfaces 50 and 52 where not polished. Additionally, compared to polished surfaces, the granular profile may provide benefits to sintered material 16 in some applications, such as scattering light for a backlight unit of a display, increasing surface area for greater adhesion of a coating or for culture growth. Applicant believes that sheets of sintered ceramic or other materials cut from boules may not have readily identifiable grain boundaries present on surfaces thereon, in contrast to sintered material 16 formed as discussed herein. Applicant further believes that boule-cut articles may typically be polished to correct rough surfaces from the cutting. However, Applicant believes that surface polishing may be particularly difficult or cumbersome for very thin articles of sintered ceramic or other materials, with the degree of difficulty increasing as the thickness of the sintered material decreases and as the surface areas of sintered material surfaces increases. However, sintered articles manufactured according to the presently disclosed technology may be less constrained by such limitations because articles manufactured according to the present technology may be continuously manufactured in long lengths of tape with high quality surfaces that do not need polishing.

Further, dimensions of system 10, as disclosed herein, may be scaled to accommodate and sinter wider articles, such as having a width of at least 2 centimeters, at least 5 centimeters, at least 10 centimeters, at least 50 centimeters.

In contemplated embodiments, the substantially equal surface quality metric of first and second major surfaces 50 and 52 is a highly consistent level of unpolished surface roughness of both major surfaces 50 and 52. In specific embodiments, the unpolished major surfaces 50 and 52 both have a roughness (Ra) from 10 nm to 1000 nm across a distance of 10 mm in one dimension along the length of the article, such as from 15 nm to 800 nm. In specific embodiments, the unpolished major surfaces 50 and 52 both have a roughness from 1 nm to 10 µm over a distance of 1 cm along a single axis.

In contemplated embodiments, the substantially equal surface quality metric of first and second major surfaces 50 and 52 is a highly consistent defect quantity measurement of both major surfaces 50 and 52. In some such embodiments, the defect quantity measurement is a measurement of the area of each surface 50 and 52 occupied by defects. In an exemplary embodiment, the surface consistency of both surfaces 50 and 52 is such that a total average area of surface defects per square centimeter of first major surface 50 is within plus or minus 50% of a total average area of surface defects per square centimeter of second major surface 52. In such embodiments, "surface defects" are abrasions and/or adhesions having a dimension along the respective surface of at least 15, 10, and/or 5 micrometers. In specific embodiments, the area of a surface defect is the area of a depression or a projection measured in a plane perpendicular to the thickness of sintered sheet 16. In specific embodiments, the defects are at least one of a depression or projection having a depth or height relative to the average position of surfaces 50 and 52 that is at least two times the average grain height H1, and in yet other embodiments, the defects are at least one of a depression or projection having a depth or height relative to the average position of surfaces 50 and 52 that is at least 300 µm.

In some other embodiments, the defect quantity measurement is a measurement of the number of defects present per unit area on each surface 50 and 52. In some embodiments, the surface quality is such that, on average per square centimeter, major surfaces 50 and 52 both have fewer than 15, 10, and/or 5 surface defects that have at least one dimension greater than 15, 10, and/or 5 micrometers. In specific embodiments, the surface quality is such that, major surfaces 50 and 52 both have fewer than 3 such surface defects on average per square centimeter, and more specifically fewer than one such surface defect on average per square centimeter. Accordingly, sintered articles manufactured according to inventive technologies disclosed herein may have relatively high and consistent surface quality. Applicant believes that the high and consistent surface quality of sheet of sintered material 16 facilitates increased strength by reducing sites for stress concentrations and/or crack initiations. Applicant believes that this low defect rate on both major surfaces 50 and 52 of sintered material 16 is enabled by the noncontact system and process discussed herein. Further, Applicant believes that material sintered while supported by a setter board will typically have at least one surface having a much higher defect rate than the other surface resulting from adhesions and/or abrasions caused as the sintering material contracts while engaged with the setter board.

In contemplated embodiments, the substantially equal surface quality metric of first and second major surfaces 50 and 52 is a highly consistent flatness measurement of both major surfaces 50 and 52. In specific embodiments, the high level of flatness is achieved in the as-formed article from system 10 without the need for reshaping, grinding, pressing, etc. In specific embodiments, surfaces 50 and 52 both have a flatness from about 0.1 µm to about 50 µm over a distance of 1 cm along a single axis, such as along the length of sheet of sintered material 16. Such flatness, in combination with the surface quality, surface consistency, large area, thin thickness, and/or material properties of materials disclosed herein, may allow sheets, substrates, sintered tapes, articles, etc. to be particularly useful for various applications, such as tough cover sheets for displays, high-temperature substrates, flexible separators, and other applications.

In contemplated embodiments, the substantially equal surface quality metric of first and second major surfaces 50 and 52 is a highly consistent chemical composition of regions of sintered material 16 adjacent to both major surfaces 50 and 52. Applicant believes that setter board based sintering process are unable to achieve the very low levels of material contaminants on both sides of the sintered article due to diffusion, adherence, etc. of material from the setter board into the sintered article. In specific embodiments, first and second major surfaces 50 and 52 have a high purity and highly consistent composition such that the chemical composition of material 16 within a depth of 1 µm from first surface 50 is at least 99.9% by weight of material of present in tape 14 (e.g., a polycrystalline ceramic material, synthetic material, binder material) and the chemical composition within a depth of 1 µm from second surface 52 is also at least 99.9% by weight of material of present in tape 14. In specific embodiments, first and second major surfaces 50 and 52 have a high purity and highly consistent composition such that the chemical composition of material 16 within a depth of 1 µm from first surface 50 is at least 99.9% by weight of the inorganic material of tape 14 (e.g., a polycrystalline ceramic material, synthetic material) and the chemical composition within a depth of 1 µm from second surface 52 is also at least 99.9% by weight of material of the inorganic material of tape 14.

In such embodiments, the chemical composition of the regions adjacent the first and second surfaces are substantial the same as the chemical composition at the midpoint of the thickness of sintered material 16. In some such embodiments, the chemical composition of material 16 within a depth of 1 µm from first surface 50 is at least 99.9% by weight of the inorganic material of tape 14 (e.g., a polycrystalline ceramic material, synthetic material), the chemical composition within a depth of 1 µm from second surface 52 is also at least 99.9% by weight of material of the inorganic material of tape 14, and the chemical composition at the midpoint of the thickness is also at least 99.9% by weight of material of the inorganic material of tape 14.

In yet other embodiments, the high level of chemical composition consistency between surfaces 50 and 52 results from the lack of chemical contamination typically found in setter board based processes. In such embodiments, the first surface quality metric and second surface quality metric of surfaces 50 and 52 are each a chemical composition of the sintered article within a depth of 0.5 µm from the first and second major surfaces, respectively, wherein the first surface quality metric is substantially the same as the second surface quality metric such the chemical composition within a depth of 0.5 µm from the first surface is at least 99.9% the same as the chemical composition within a depth of 0.5 µm from the second surface.

According to exemplary embodiments, sheet of sintered material 16 includes polycrystalline ceramic. According to an exemplary embodiment, sheet of sintered material 16 includes (e.g., is, consists essentially of, consists at least 50% by weight of) zirconia, alumina, spinel (e.g., $MgAl_2O_4$, $ZnAl_2O_4$, $FeAl_2O_4$, $MnAl_2O_4$, $CuFe_2O_4$, $MgFe_2O_4$, $FeCr_2O_4$,), garnet, cordierite, mullite, sialon, perovskite, pyrochlore, silicon carbide, silicon nitride, boron carbide, transitional metal borides and carbides, $ZrB_2$, $HfB_2$, $TiB_2$, ZrC, TiC, silicon alumina nitride, and/or aluminum oxynitride. In some embodiments, sheet of sintered material 16 includes ion conductors for oxygen ions, Li ions, Na ions, proton conductors, ceramics with low dielectric constants, ceramics with high dielectric constants, sintered glass ceramics such as cordierite, ceramics and sintered glass and glass ceramics that are porous and ceramics and sintered glass and glass ceramics with no open porosity, translucent ceramics and transparent ceramics. In some embodiments, sheet of sintered material 16 is a metal. In other embodiments, sheet of sintered material 16 is glass sintered from powder grains. In some embodiments, sheet of sintered material 16 is an IX glass and/or glass-ceramic. Materials disclosed herein may be synthetic.

For example, in some embodiments, sheet of sintered material 16 is made from alumina powder having a median particle size diameter of from 50 to 1000 nanometers and a BET surface area of from 2 to 30 $m^2/g$. In specific embodiments, sheet of sintered material 16 is made from a tape-casted alumina powder of from 99.5 to 99.995 weight percent alumina and from about 100 to about 1000 parts per million of a sintering additive, such as magnesium oxide. In some embodiments, sheet of sintered material 16 is translucent. Sheet of sintered material 16 may have a total transmittance of at least 30% at wavelengths from about 300 nm to about 800 nm when sheet of sintered material 16 has a thickness of 500 µm or less. In some embodiments, the total transmission through sheet of sintered material 16 is from about 50% to about 85% at wavelengths from about 300 nm to about 800 nm when sheet of sintered material 16 has a thickness of 500 µm or less. In some embodiments, diffuse transmission through sheet of sintered material 16 is from about 10% to about 60% at wavelengths from about 300 nm to about 800 nm when the sheet has a thickness of 500 µm or less. In contemplated embodiments, sheet of sintered material 16 may have the above-disclosed transmittance percentages with a wavelength in the above-disclosed ranges but with other thicknesses, such as other thicknesses disclosed herein. Materials disclosed herein other than alumina may also result in such a translucent sintered article.

In various embodiments, the thin, large and/or high surface quality bearing ceramic articles enabled by the system and method of the present application have a wide variety of applications. In various embodiments, sintered material 16 is believed to have application as substrates such as in batteries, on printed circuit boards, as cover sheets for displays, such for handheld devices, or the articles may be otherwise useful. Sintered material 16 may be used in high power, thin disk lasers. Sintered ceramics can be used as hard scratch-resistant coatings and as armor.

Figure 9:
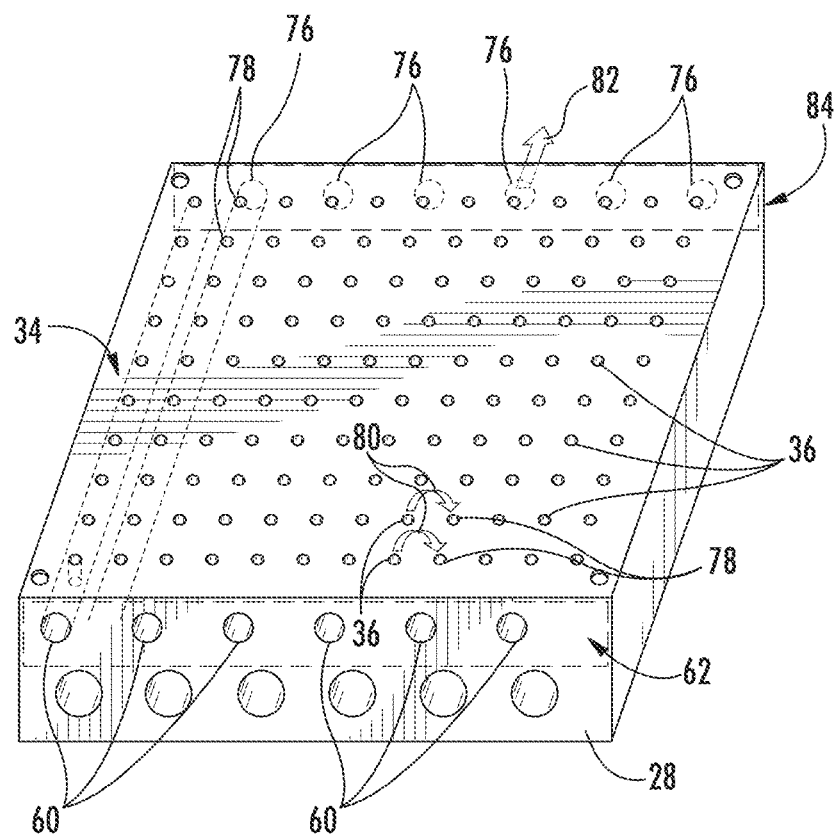
FIG. 9 is a venting gas bearing according to an exemplary embodiment.
Figure 10:
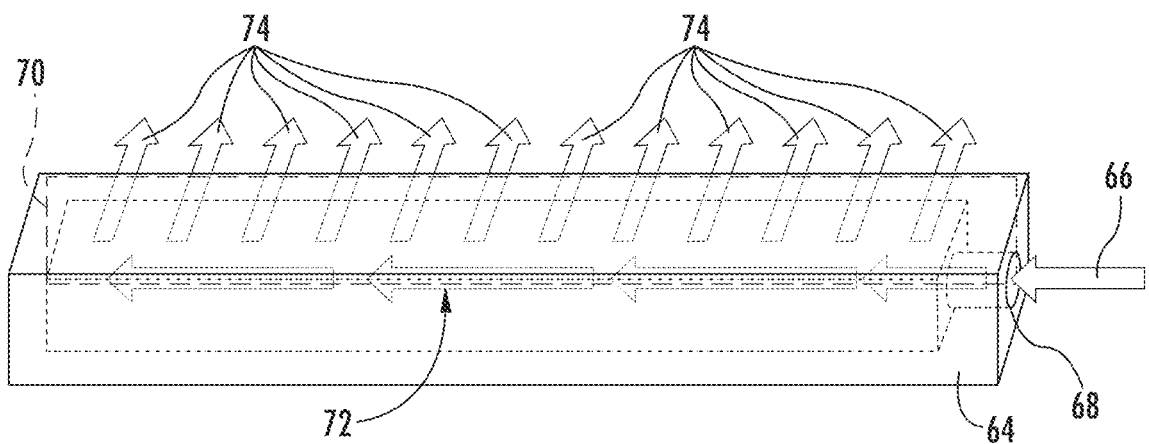
FIG. 10 is a gas bearing plenum according to an exemplary embodiment.

Referring to FIG. 9 and FIG. 10, gas delivery provided by gas bearings 26 and 28 are shown and described in more detail, according to exemplary embodiments. FIG. 9 shows gas bearing 28 with the understanding that gas bearing 26 is formed in substantially the same manner as gas bearing 28. Gas bearing 28 includes a plurality of channels 60 extending widthwise across the bearing. Channels 60 deliver pressurized gas from a plenum 64 to nozzles 36. Surface 62 allows for attachment of gas bearing 28 to the plenum 64.

As shown in FIG. 10, plenum 64 receives a flow pressurized gas 66 and includes a port 68 for connecting to a source of pressurized gas. Rear face 70 of plenum 64 attaches to surface 62 of gas bearing 28. Plenum 64 includes a flow channel 72 that directs gas 66 through plenum 64 to gas flows 74 that are directed into channels 60 of gas bearing 28. Then the gas flows into channels 60 and out of nozzles 36 where it supports tape 14 and sintered material 16 as discussed above. Plenum 64 can be ported to monitor and/or control air pressure supplied to the gas bearing.

Gas bearing 28 includes a plurality of vent channels 76 fed by a plurality of vent openings 78 located in bearing surface 34. Gas 80 escaping nozzles 36 is received by vent openings 78. The gas 80 flows into vent openings 78 and through vent channels 76 such that exiting gas 82 is received by a plenum (e.g., to vacuum draw gas 82) attached to rear surface 84 of gas bearing 28.

As shown in FIG. 9, pressurized gases 80 leave by flowing laterally in the gap between the tape and the gas bearing elements. In this design, the gas accumulates moving from the center of the gas bearing element to the edges. The rate of flow of gas in the lateral direction is highest near the edges. The accumulation of gases becomes larger as the width of the gas bearing system increases to handle wider ceramic articles. It can be advantageous to manage the flow of the departing gases through the design of the gas bearing elements. The viscous forces on the ceramic due to the flow of the pressurized gas may be minimized or a viscous force can be applied to move the ceramic. The exiting gas 82 can be directed out of the system. By controlling the venting gas in this manner, the field of pressure on tape 14 during sintering can be made more homogeneous and the amount of pressurized gas supplied by the gas bearings to support tape 14 can be reduced or minimized.

Gas bearings 26 and 28 may be structured or configured to facilitate functionality described herein. In various embodiments, the spatial pattern of nozzles 36 and/or vent openings 78 may be arranged to improve or optimize venting gas. In various embodiments, the diameter of the holes 36 is greater than 100 µm, specifically greater than 300 µm and in some embodiments greater than 500 µm. In various embodiments, the pitch of holes 36 is less than 10 mm, specifically less than 7 mm and more specifically less than 3 mm. In various embodiments, holes 36 of lower air bearing 28 align with holes 36 of the upper air bearing 26. In other embodiments, the air diffuser holes 36 of air bearings 26 and 28 are offset from each other.

In various embodiments, the diameter and/length of nozzles 36 and/or vent openings 78 may vary along surface 34 to improve or optimize venting gas. In various embodiments, surface 34 may include one or more trench extending across the bearing surface to improve or optimize venting gas. In some embodiments, gas bearings 26 and 28 may be asymmetrical in design to create a net force that cause movement of tape 14 and sintered material 16 such as to convey tape 14 and sintered material 16 through system 10.

In various embodiments, system 10 and specifically gas bearings 26 and 28 are configured for heat recycling. In one embodiment, system 10 and specifically gas bearings 26 and 28 are configured to reuse at least 30% gas from the gas bearing. In another embodiment, system 10 is configured to have the gas bearing gas go through a heat exchanger.

Materials for gas bearings 26 and 28 and plenum 64 are selected based upon temperature and atmospheric requirements of tape 14 and sintered material 16 and based upon the function of the associated station or zone of system 10. In one embodiment, gas bearings 26 and 28 and plenum 64 are made from aluminum. In another embodiment, gas bearings 26 and 28 and plenum 64 are made from a bronze 700XX alloy which can operate at temperatures of up to or about 850° C. In another embodiment, gas bearings 26 and 28 and plenum 64 are made from high temperature nickel-chromium alloys, such as Rolled Alloy 602 CA, 333 or similar which can operate at temperatures up to about 1200° C. In another embodiment, gas bearings 26 and 28 and plenum 64 are made from precious metals like platinum and its alloys with rhodium (e.g., alloys available from Heraeus) which can operate at temperatures of about 1700° C. and are inert in oxidizing atmospheres. In another embodiment, gas bearings 26 and 28 and plenum 64 are made from ceramics such as alumina, silicon carbide, boron carbide, and graphite.

In a particular embodiment, gas bearings 26 and 28 and plenum 64 for binder removal zone 18 are made from a material such as Bronze 700XX. In embodiments in which sintering zone 22 is configured to sinter alumina or zirconia or other ceramic materials that require sintering temperatures above 1250° C., gas bearings 26 and 28 and plenum 64 within sintering zone 22 are made from a high temperature nickel-chrome alloy. In embodiments where higher sintering temperatures are needed, gas bearings 26 and 28 and plenum 64 for sintering zone 22 are made from a material that can withstand an oxidizing environment and elevated temperatures like a precious metal alloy or ceramic such as silicon carbide.

Air Bearing Example 1

Figure 11:
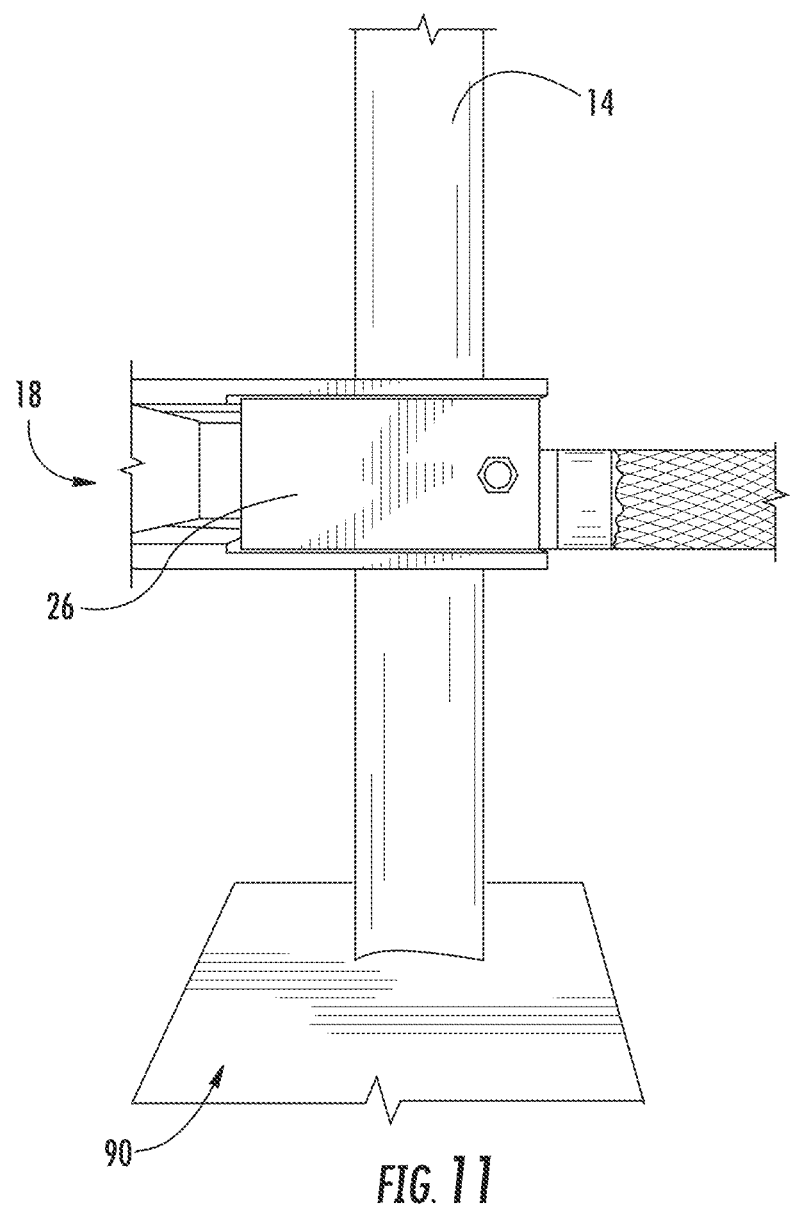
FIGS. 11 and 12 show an air bearing supporting a tape material during binder burn-off according to an exemplary embodiment.
Figure 12:
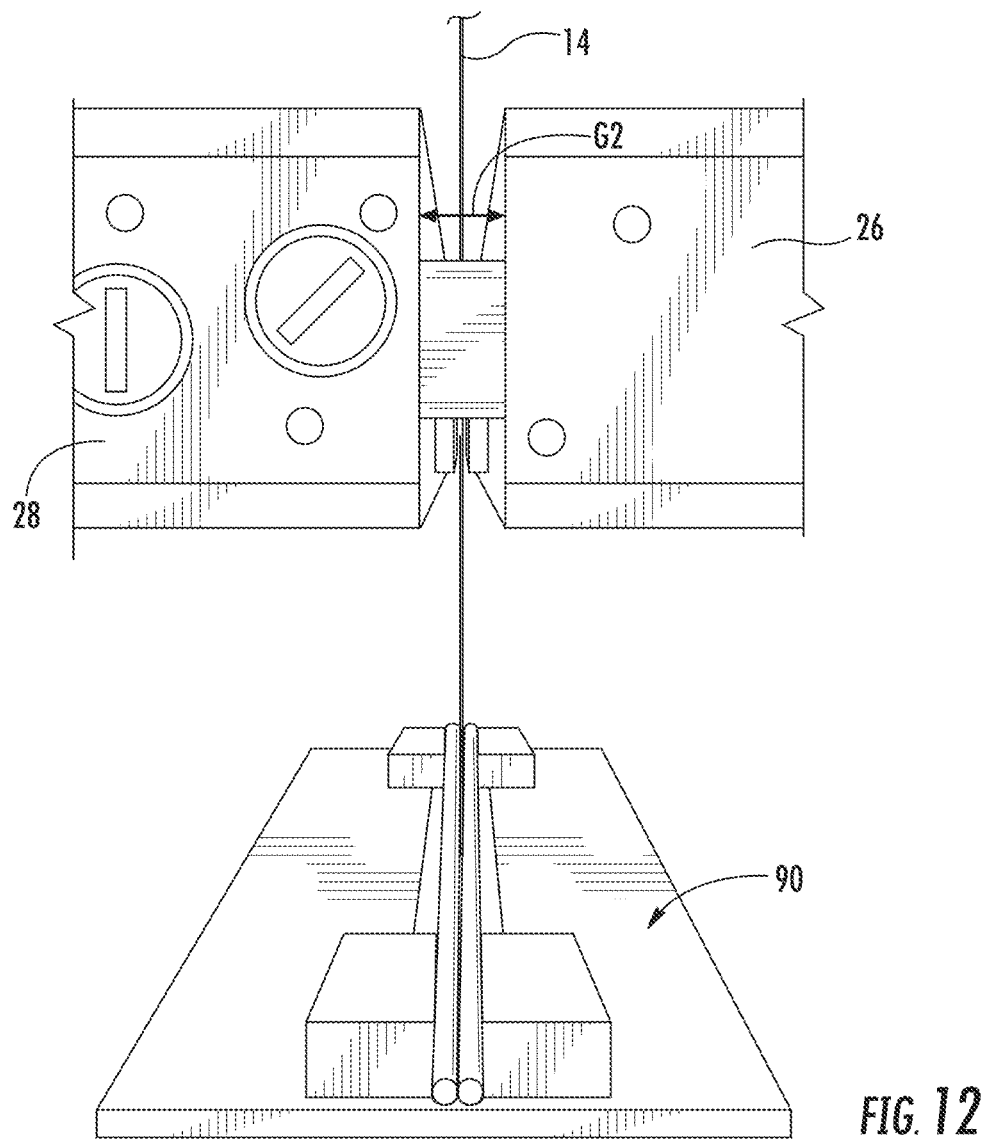

Referring to FIG. 11 and FIG. 12, an example of using a high temperature air bearing as part of a process for continuous sintering of alumina tape is shown. In this example, the green tape 14 is 50.8 mm wide and 40 μm thick prior to binder removal. It is being fed at a rate of 75 mm/min in the downward direction into opposed stainless steel, high temperature air bearings for pyrolysis of the organic binder material, such as described above regarding binder removal zone 18. The gap between opposing air bearing surfaces is 4.38 mm and the temperature is 500° C. The pressure delivering air in both elements is 10 psi. The advantage of the use of an air bearing is visible in the figure. The pressure from the opposed air bearings holds the tape 14 flat and limits/prevents warp or distortion as the organic binder is pyrolyzed. After pyrolysis, the tape travels further downward into a furnace 90 at 1050° C. for partial sintering. In this example, the tape is not supported with air bearings in the furnace 90 during the sintering step nor is it supported by a setter. Instead, the tape 14 supports its own weight so the process remains contactless and free of friction. The partially sintered tape exiting furnace 90 is flat, width shrinks by 2.6%, and the weight drops by 8.6%.

Air Bearing Example 2

Figure 14:
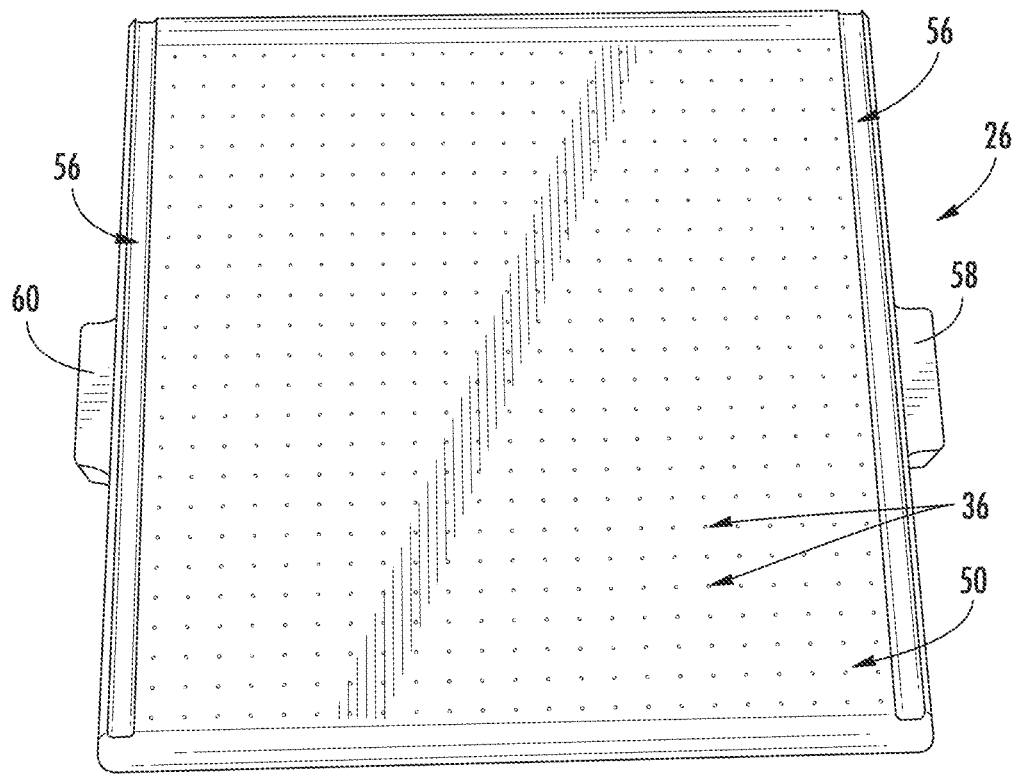
FIG. 14 shows an air bearing surface of an air bearing, according to an exemplary embodiment.
Figure 15:
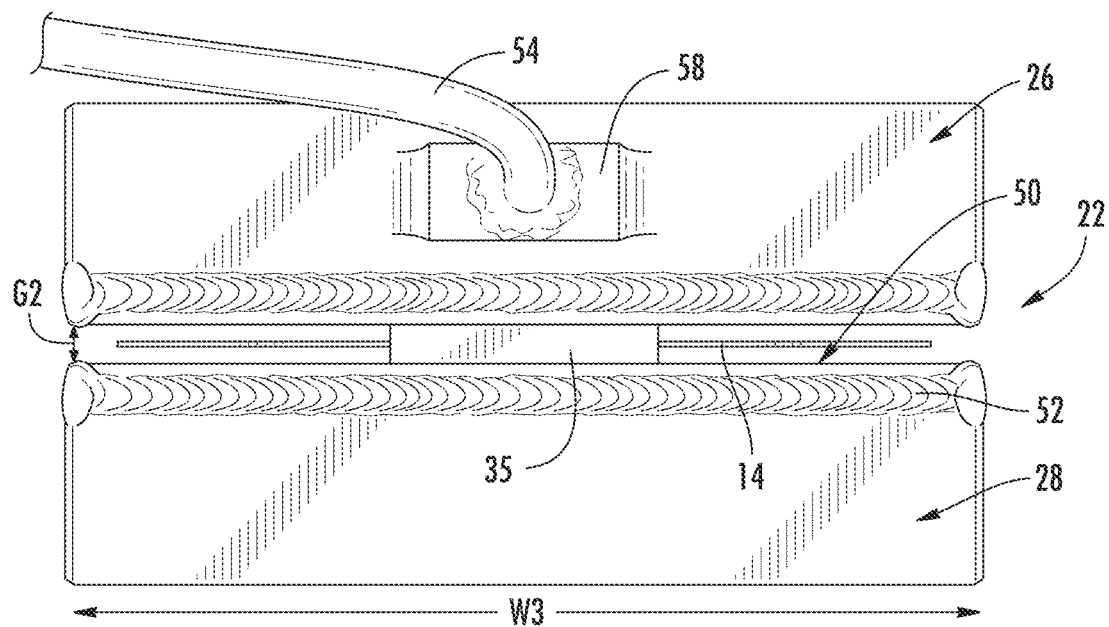
FIG. 15 shows a side view of an air bearing, according to an exemplary embodiment.

Referring to FIG. 14 and FIG. 15, an example of a high temperature air bearing, such as air bearings 26 and 28, designed and tested to produce sintered articles is shown according to an exemplary embodiment. In this test, the air bearing shown in FIGS. 14 and 15 was used for a batch sintering test (rather than a continuous process). Referring to FIG. 14 and FIG. 15, in this embodiment, the gas diffuser holes, shown as holes 36, are arranged in a regularly spaced grid. Holes 36 deliver the supporting or working gas to the gap of the bearing such that the article 14 is supported by the bearing. Holes 36 are formed in a gas diffuser plate 50, and gas diffuser plate 50 is coupled to the plenum via a weld joint 52. Applicant has determined that the size and spacing of holes 36 are selected to provide different levels of article support within the gas bearing. In the specific example shown in FIGS. 14 and 15, gas diffuser holes 36 have a diameter of 0.5 mm and pitch of 2.54 mm.

Preheated gases such as nitrogen or air are supplied through tubing 54 made from the same or similar metal that the plenum of air bearing 26 is made from, and the supplied gas then flows out the diffuser holes 36 into the gap between the opposing air bearings 26 and 28. In the specific example shown in FIG. 15, nitrogen was the gas supplied to air bearings 26 and 28 to support the zirconia tape material 14 within the air bearing gap.

Referring to FIG. 14, each of the air bearings 26 and 28 include a groove or trench 56 machined into air diffuser plate 50 adjacent its outer perimeter. In the particular embodiment shown, groove 56 is 4 mm wide and 1 mm deep. Groove 56 provides a stable area to engage with spacers or stand-offs 35 that support air bearings 26 and 28 relative to each other and that defines and maintains the gap spacing between opposing air bearing surfaces. In addition to maintaining the gap spacing, stand-offs 35 also provide a lateral constraint to the article being sintered which acts to block the material being sintered from sliding laterally out of the gap between the opposing air bearing surfaces. In various embodiments, stand-offs 35 may be formed from a ceramic or metal, and in a specific embodiment is formed from an alumina material.

As shown in FIG. 14, at least one of the air bearings 26 or 28 includes a mounting portion 58 that includes a recess or other coupling arrangement for coupling of tubing 54 to the air bearing. In addition, at least one of the air bearings 26 or 28 includes a mounting portion 60 that includes a recess or other coupling arrangement for receiving tubing of a pressure sensing device. In the specific embodiment shown, air bearings 26 and 28 have a width W3, which is between 100 mm and 150 mm and specifically is 127 mm.

FIG. 15 is a side view of a pair of air bearings 26 and 28, each generally having the air hole pattern as shown in FIG. 14. As shown in FIG. 15, in this particular example, the opposing air bearings 26 and 28 are separated by alumina stand-offs 35, and the material to be sintered, tape 14, is green zirconia (3-YSE) tape. The tape 14 is suspended between bearings 26 and 28 by the centering forces from the pressure of the gas flowing into the air bearing gap through holes 36. In this example, the air bearing 26 and 28 were constructed from RA-333 nickel-chromium alloy sold by Rolled Alloys of Temperance, Mich. It is capable of operation to approximately 1200° C. In this example to deliver the sintering heat, opposed air bearings 26 and 28 were installed inside an electrically powered furnace.

For high temperature sintering, Applicant has determined that diffuser plates 50 of sufficient thickness perform well. In specific embodiments, diffuser plate 50 of air bearings 26 and/or 28 is at least 2 mm thick, specifically at least 4 mm thick and more preferably at least 6 mm thick.

As discussed above, the spacing of the opposing air bearings 26 and 28 defines a gap, shown as G2, in FIG. 15. Based on Applicant's testing, Applicant has determined that the gap sizing relates to various sintering properties. In particular, as discussed below, Applicant has discovered that gap sizing, particularly small gap sizing, influences the position of the article within the bearing during sintering and also may influence sintered article properties such as flatness and transparency. Thus, in the example shown in FIG. 15, G2 is selected such that G2 minus the thickness of the tape 14 is less than 5 mm, specifically less than 2 mm and more specifically less than 1 mm.

In various embodiments, the material used for the stand-offs 35 is selected for compatibility with the air bearing materials. In a specific embodiment, stand-offs 35 are formed from alumina for contact with high temperature nickel-chrome alloys or precious metals like platinum, that may be used to form air bearings 26 and 28. In specific embodiments, stand-offs 35 include vents for exit of the gas injected into the air bearing gap through the holes 36. The spacing of the vents within stand-offs 35 may be similar to the pitch of the diffuser hole 36. In some embodiments, the stand-offs include notches along the lateral edges of each stand off to provide venting.

In some embodiments, outer, opposing surfaces of diffuser plates 50 of air bearings 26 and 28 are flat to provide a flat article after pre sintering or after sintering. While in other embodiments, outer, opposing surfaces of diffuser plates 50 of air bearings 26 and 28 may be curved or have other shapes to impart that shape to the pre-sintered or fired article. In operation, pressure and gas flow through holes 36 into the air bearing gap is controlled to provide the desired support to tape 14 during sintering. In an exemplary embodiment, the pressure in the plenum of each air bearing 26 and 28 is less than 40 psi, specifically less than 20 psi, and more specifically less than 5 psi. In various embodiments, the rate of gas flow to the bearing per unit area of active diffuser plate surface is less than 0.1 SCFM/cm$^2$ and more than 0.002 SCFM/cm$^2$. In other embodiments, the rate of gas flow to the bearing per unit area of active diffuser plate surface is less than 0.04 SCFM/cm$^2$ and more than 0.004 SCFM/cm$^2$.

Sintering Test Example 1

Figure 16:
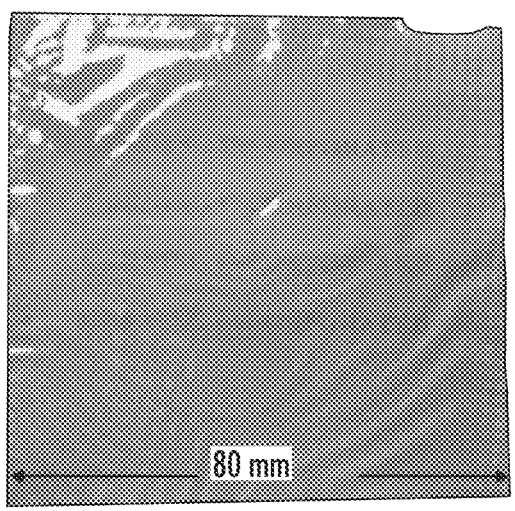
FIGS. 16 and 17 show photographs of sintered zirconia tape sintered using different air bearing gap sizes, according to an exemplary embodiment.
Figure 17:
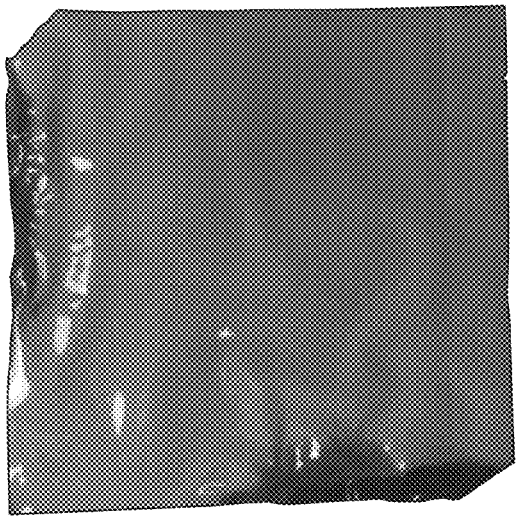

Utilizing the air bearing arrangement shown in FIG. 14 and FIG. 15, zirconia tape was sintered utilizing different bearing gap spacing, G2, and based on this testing, Applicant determined that gap spacing influences various properties of the sintered article. Referring to FIGS. 16 and 17, zirconia (3-YSE) sintered tape having a thickness of 20 μm and post sintering width of 80 μm, was sintered via air bearings 26 and 28 using different gap sizes, G2. Both materials were heated within air bearings 26 and 28 for four hours at 1150° C. In this test, the gas flow to the air bearings was nitrogen at 1 SCFM.

The sintered zirconia tape shown in FIG. 16 was sintered in an air bearing having a 0.5 mm gap, G2, and was suspended throughout the sintering process (i.e., there was no contact with the stand-offs or metal of the air bearing. As shown in FIG. 16, utilizing this gap spacing the sintered zirconia tape was mostly flat and is sintered to translucent indicating a low level of porosity.

The sintered zirconia tape shown in FIG. 17 was sintered in an air bearing having a 1.5 mm gap, G2. As compared to the tape shown in FIG. 16, the tape sintered in the 1.5 mm gap air bearing is visibly more wrinkled. In addition, the tape shown in FIG. 17 moved parallel to the faces of the air bearing diffuser plates and contacted two of the stand-offs. Applicant believes this movement to have occurred because when tape is sintered in the larger, 1.5 mm gap, the tape has more space to move and the centering forces on the tape provided by the gas delivered to the gap are lower. The forces generated by contact between the tape and the stand-offs and the thin flexible nature of the 3-YSE tape has led to buckling at the contact sites. Regions of the buckled zone that contacted the metal surface of the air bearing diffuser plate are dark in color due to chemical interdiffusion.

Sintering Test Example 2

Figure 18:
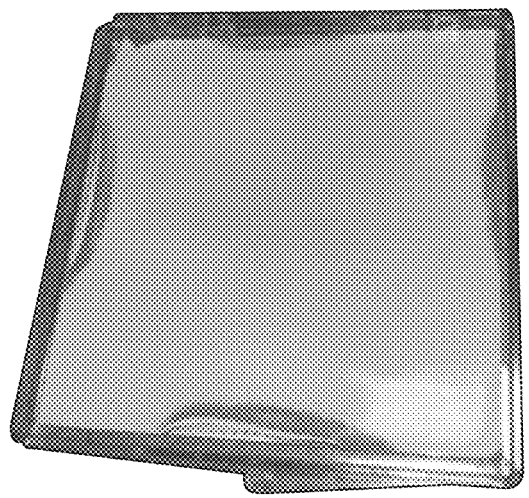
FIGS. 18 and 19 show photographs of sintered alumina tape sintered using different air bearing gap sizes, according to an exemplary embodiment.
Figure 19:
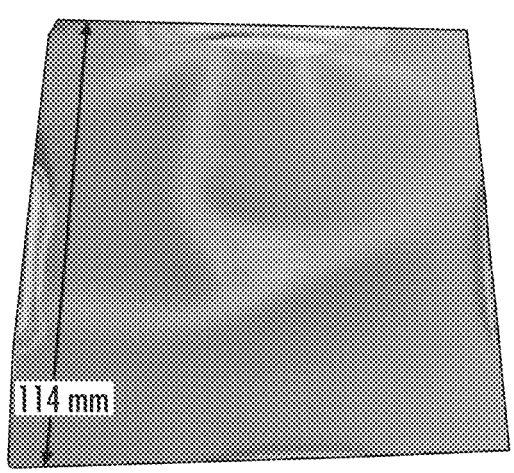

As shown in FIG. 18 and FIG. 19, similar results were obtained with 70 μm thick alumina tape after partial sintering at 1150° C. for 6 hours in the same air bearing under the same conditions as those discussed above regarding FIGS. 16 and 17. FIG. 18 shows alumina tape partially sintered within an air bearing having a 0.5 mm gap, and FIG. 19 shows alumina tape partially sintered within an air bearing having a 1.5 mm gap. The alumina tape shown in FIG. 18 is flatter after partial sintering in the 0.5 mm gap as compared to the alumina tape shown in FIG. 19. In addition, the zone of contact with the stand-offs shown in FIG. 18 is smaller than the similar contact zone shown in FIG. 19. More than 90% of the tape was pre-sintered without contact to either of the bearing faces.

Based on this testing, Applicant has hypothesized that contact of the alumina tape to the air bearing face near the stand-offs appears to be due to inadequate pressure to support the tape by the working gas in this region. Nitrogen gas flow is diverted away from the stand-offs, and there is visible oxidation of the metal diffuser plates due to back diffusion of oxygen from air under and over the stand-offs. Other regions of the air diffuser plate are covered by nitrogen and thus less oxidized. Thus, based on this testing, Applicant has determined that, in at least some embodiments, stand-offs with periodically spaced vents or holes with spacing similar to the pitch of the different holes would make flow of nitrogen exiting the air bearing more uniform around the perimeter, and Applicant believes that increased uniformity would provide better support for the tape within the air bearing gap, reduction/elimination of contact with the bearing faces near the stand-offs, and/or improved tape flatness.

Sintering Test Example 3

Figure 20:
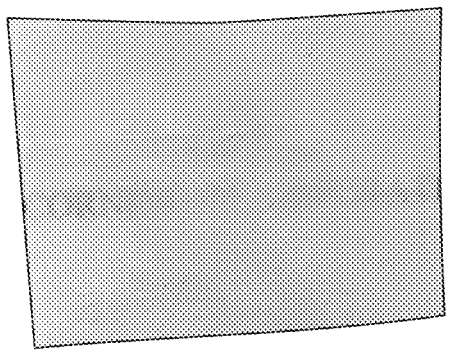
FIGS. 20 and 21 show photographs of Pyrex tape material before and after sintering, according to an exemplary embodiment.
Figure 21:
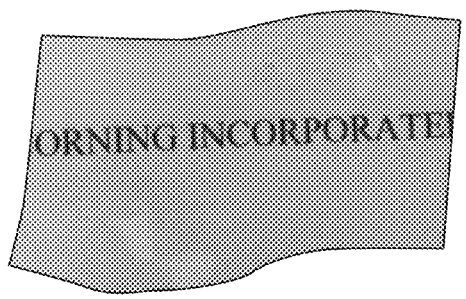

Referring to FIG. 20 and FIG. 21, as another example, Pyrex 7761 frit powders were calendared to a thickness of about 70 μm. The ribbon was heated in the opposed air bearings shown in FIG. 14 and FIG. 15 at 750° C. for 2 hrs. with a flow of 1 SCFM of gas (e.g., air or nitrogen) to the bearings. The gap spacing, G2, was 0.5 mm. FIG. 20 shows the 70 μm thick Pyrex tape before heating/sintering, and FIG. 21 shows the same tape after heating/sintering. As shown in FIG. 21, flat and transparent sintered glass was obtained. Applicant notes that the holes in the tape shown in FIG. 21 were formed from handling introduced after sintering and not from the sintering process.

Sintering Test Example 4

Figure 22:
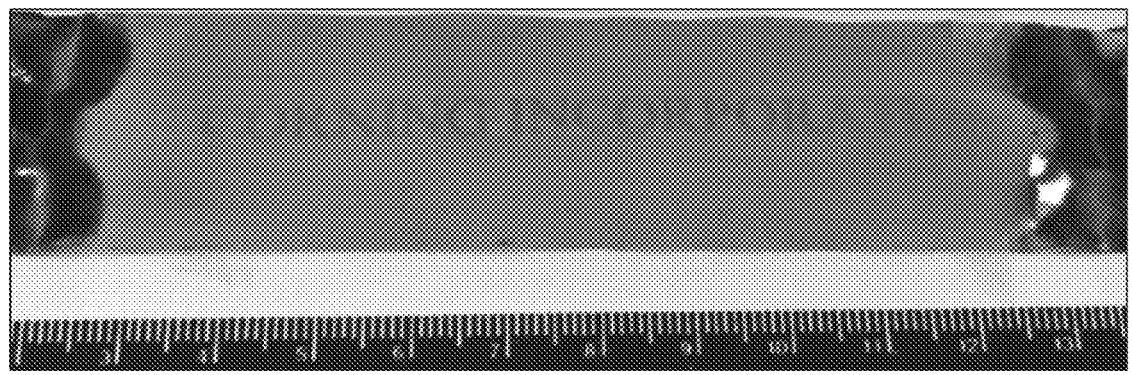
FIGS. 22 and 23 show photographs of sintered zirconia tape material showing the effect of application tension to the material during sintering, according to an exemplary embodiment.
Figure 23:
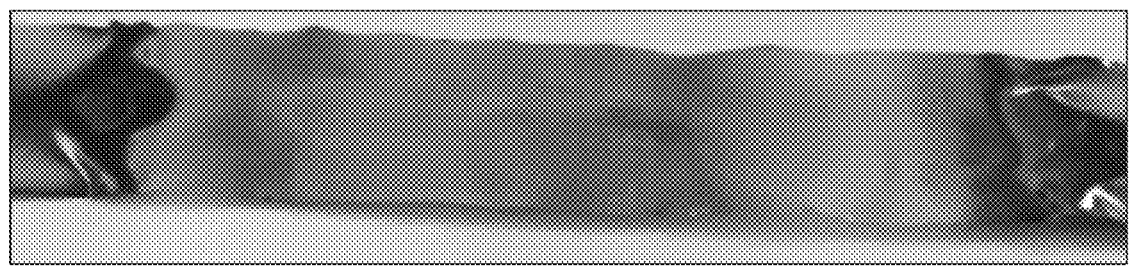

Referring to FIG. 22 and FIG. 23, Applicant has determined that flatness of the sintered tape can be affected and improved by application of a small amount of externally applied stress, in at least some embodiments. Ribbons of 40 μm thick zirconia (3-YSE) tape that are 40 mm wide (green) and approximately 300 mm long were fired at 1175° C. for 4 hrs. with the center section of the ribbon suspended between the opposed air bearings of FIGS. 14 and 15 without contacting the air bearing surfaces. FIG. 22 shows a tape sintered with 75 kPa of tension applied during sintering, and FIG. 23 shows the tape sintered without tension. The ribbon sintered with applied tension as shown in FIG. 22 is visibly flatter than the one without, shown in FIG. 23. In addition, ribbon sintered with applied tension as shown in FIG. 22 is more translucent than the one without, shown in FIG. 23.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one. It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A process for manufacturing a sintered article, comprising:
   conveying a portion of a tape through a furnace, wherein the tape comprises grains of ceramic and/or minerals;
   sintering the grains of ceramic and/or minerals of the portion of tape in the furnace; and
   tensioning the tape during the sintering,
   wherein the tape simultaneously extends into, through, and out of the furnace,
   wherein, after the sintering, length of the tape is at least 100 times greater than width of the tape, and wherein the width is at least 10 times greater than thickness of the tape, and wherein the thickness is no more than 500 micrometers.

2. The process of claim 1, wherein the sintering is at a temperature greater than 800 degrees Celsius.

3. The process of claim 1, wherein the tensioning comprises 75 kPa of tension.

4. The process of claim 1, wherein the tensioning flattens the tape, and wherein surfaces of the tape, after the sintering, have a flatness from 0.1 µm to 50 µm over a distance of 1 cm along a length of tape.

5. The process of claim 1, wherein the tensioning increases translucence of the tape; and wherein the tape, after the sintering, has a total transmittance of at least 30% at wavelengths from 300 nm to 800 nm.

6. The process of claim 5, wherein diffuse transmission through tape, after the sintering, is in a range from 10% to 60% at wavelengths from 300 nm to 800 nm.

7. A process for manufacturing sintered article, comprising:
   conveying a portion of a tape through a furnace, wherein the tape comprises grains of ceramic and/or minerals;
   sintering the grains of ceramic and/or minerals of the portion of tape in the furnace; and
   tensioning the tape during the sintering,
   wherein the tape is continuously conveyed through the furnace during the sintering,
   wherein, after the sintering, length of the tape is at least 100 times greater than width of the tape, and wherein the width is at least 10 times greater than thickness of the tape, and wherein the thickness is no more than 500 micrometers.

8. The process of claim 7, further comprising unwinding the tape from a reel during the conveying.

9. The process of claim 8, further comprising collecting the tape on an uptake reel after the sintering.

10. The process of claim 7, wherein the sintering is at a temperature greater than 800 degrees Celsius, and wherein the tensioning comprises 75 kPa of tension.

11. The process of claim 7, wherein the tensioning flattens the tape, and wherein surfaces of the tape, after the sintering, have a flatness from 0.1 µm to 50 µm over a distance of 1 cm along a length of tape.

12. The process of claim 7, wherein the tensioning increases translucence of the tape; and wherein the tape, after the sintering, has a total transmittance of at least 30% at wavelengths from 300 nm to 800 nm; and wherein diffuse transmission through tape, after the sintering, is in a range from 10% to 60% at wavelengths from 300 nm to 800 nm.

13. A process for manufacturing a sintered article, comprising:
   conveying a portion of a tape through a furnace, wherein the tape comprises grains of ceramic and/or minerals;
   sintering the grains of ceramic and/or minerals of the portion of tape in the furnace; and
   tensioning the tape during the sintering,
   wherein, in a processing direction, the tape is longer than the furnace,
   wherein, after the sintering, length of the tape is at least 100 times greater than width of the tape, and wherein the width is at least 10 times greater than thickness of the tape, and wherein the thickness is no more than 500 micrometers.

14. The process of claim 13, wherein the sintering is at a temperature greater than 800 degrees Celsius.

15. The process of claim 13, wherein the tensioning comprises 75 kPa of tension.

16. The process of claim 13, wherein the tensioning flattens the tape; and wherein surfaces of the tape, after the sintering, have a flatness from 0.1 µm to 50 µm over a distance of 1 cm along a length of tape.

17. The process of claim 13, wherein the tensioning increases translucence of the tape; and wherein the tape, after the sintering, has a total transmittance of at least 30% at wavelengths from 300 nm to 800 nm; and wherein diffuse transmission through tape, after the sintering, is in a range from 10% to 60% at wavelengths from 300 nm to 800 nm.

18. A process for manufacturing sintered article, comprising:
   conveying a portion of a tape through a furnace, wherein the tape comprises grains of ceramic and/or minerals;
   sintering the grains of ceramic and/or minerals of the portion of tape in the furnace; and
   tensioning the tape during the sintering,
   wherein the tape is continuously conveyed through the furnace during the sintering,
   wherein the tensioning flattens the tape, and wherein surfaces of the tape, after the sintering, have a flatness from 0.1 µm to 50 µm over a distance of 1 cm along a length of tape.

19. The process of claim 18, wherein the sintering is at a temperature greater than 800 degrees Celsius, and wherein the tensioning comprises 75 kPa of tension.

20. The process of claim 18, wherein the tape, after the sintering, has a total transmittance of at least 30% at wavelengths from 300 nm to 800 nm.

* * * * *

UNITED STATES PATENT AND TRADEMARK OFFICE
CERTIFICATE OF CORRECTION

| | | |
|---|---|---|
| PATENT NO. | : 11,325,837 B2 | Page 1 of 1 |
| APPLICATION NO. | : 17/406206 | |
| DATED | : May 10, 2022 | |
| INVENTOR(S) | : Michael Edward Badding et al. | |

It is certified that error appears in the above-identified patent and that said Letters Patent is hereby corrected as shown below:

In the Specification

In Column 1, Line 3, below "SINTERED ARTICLE" insert -- CROSS-REFERENCE TO RELATED APPLICATIONS --.

Signed and Sealed this
Twelfth Day of July, 2022

Katherine Kelly Vidal
Director of the United States Patent and Trademark Office